(12) United States Patent
Sundaramurthy et al.

(10) Patent No.: US 11,487,016 B2
(45) Date of Patent: Nov. 1, 2022

(54) SYSTEMS AND METHODS FOR DISTRIBUTED AVIONICS PROCESSING

(71) Applicant: Honeywell International Inc., Morris Plains, NJ (US)

(72) Inventors: Vishwas Sundaramurthy, Bangalore (IN); Venkata Lakshmi Siripurapu, Bangalore (IN); Vivek Kumar Pandey, Sultanpur (IN); Damodara Venkata Hanumantha Rao Desu, Bangalore (IN); Prashant Prabhu, Bangalore (IN); Manjunath Bhixavatimath, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 200 days.

(21) Appl. No.: 17/067,276

(22) Filed: Oct. 9, 2020

(65) Prior Publication Data
US 2021/0134162 A1    May 6, 2021

(30) Foreign Application Priority Data
Oct. 31, 2019  (IN) ............................. 201911044179

(51) Int. Cl.
*G06T 7/70* (2017.01)
*B64D 47/08* (2006.01)
(Continued)

(52) U.S. Cl.
CPC .............. *G01S 19/12* (2013.01); *B64C 39/02* (2013.01); *B64D 43/00* (2013.01); *B64D 47/08* (2013.01);
(Continued)

(58) Field of Classification Search
CPC ........ G01S 19/12; G01S 19/485; G01S 19/26; G01S 19/48; G06T 7/70;
(Continued)

(56) References Cited

U.S. PATENT DOCUMENTS 9,008,868 B1   4/2015   Bantoft et al.
9,927,807 B1   3/2018   Ganjoo
(Continued)

FOREIGN PATENT DOCUMENTS

KR   10-2019-0048893 A   5/2019
WO       2019/135207 A1   7/2019

OTHER PUBLICATIONS

Extended European Search Report dated Mar. 31, 2021 in European Patent Application No. EP20203975.6 (11 pages, in English).
(Continued)

*Primary Examiner* — Mathew Franklin Gordon
(74) *Attorney, Agent, or Firm* — Bookoff McAndrews, PLLC

(57) ABSTRACT

Disclosed are methods, systems, and non-transitory computer-readable medium for distributed vehicle processing. For instance, the method may include: in response to determining a first trigger condition of a first set of trigger conditions is satisfied, performing a first process corresponding to the first trigger condition on-board a vehicle; in response to determining a second trigger condition of a second set of trigger conditions is satisfied, prompting a second process corresponding to the second trigger condition by transmitting an edge request to an edge node and receiving an edge response from the edge node; and in response to determining a third trigger condition of a third set of trigger conditions is satisfied, prompting a third process corresponding to the third trigger condition by
(Continued)

transmitting a cloud request to a cloud node and receiving a cloud response from the cloud node.

20 Claims, 15 Drawing Sheets

(51) Int. Cl.
| | |
|---|---|
| *G01S 19/12* | (2010.01) |
| *G08G 5/00* | (2006.01) |
| *G01S 19/48* | (2010.01) |
| *B64C 39/02* | (2006.01) |
| *B64D 43/00* | (2006.01) |
| *G01S 19/26* | (2010.01) |
| *H04L 43/10* | (2022.01) |
| *G06V 20/10* | (2022.01) |

(52) U.S. Cl.
CPC .............. *G01S 19/26* (2013.01); *G01S 19/48* (2013.01); *G01S 19/485* (2020.05); *G06T 7/70* (2017.01); *G06V 20/176* (2022.01); *G08G 5/003* (2013.01); *G08G 5/0004* (2013.01); *G08G 5/0008* (2013.01); *H04L 43/10* (2013.01); *G06T 2207/10032* (2013.01); *G06T 2207/30184* (2013.01)

(58) Field of Classification Search
CPC ........... G06T 2207/10032; G06T 2207/30184; G06V 20/176; B64C 39/02; B64D 43/00; B64D 47/08; G08G 5/0004; G08G 5/0008; G08G 5/003; H04L 43/10
See application file for complete search history.

(56) References Cited

U.S. PATENT DOCUMENTS

| | | |
|---|---|---|
| 2018/0183855 A1 | 6/2018 | Sabella et al. |
| 2019/0268402 A1 | 8/2019 | Kallakuri et al. |

OTHER PUBLICATIONS

Jalali, Fatemeh, et al. "Dynamic edge fabric environment: Seamless and automatic switching among resources at the edge of iot network and cloud." 2019 IEEE International Conference on Edge Computing (EDGE). IEEE, 2019. (10 pages, in English).

Li, Z. et al. "Avionics clouds: A generic scheme for future avionics systems." 2012 IEEE/AIAA 31st Digital Avionics Systems Conference (DASC) (2012): 6E4-1-6E4-10.

Requirements for Operation of Civil Remotely Piloted Aircraft System (RPAS), issued Aug. 27, 2018, by Government of India Office of the Director General of Civil Aviation.

Han-Chuan Hsieh et al., "5G Virtualized Multi-access Edge Computing Platform for IoT Applications," Journal of Network and Computer Applications, vol. 115, Aug. 1, 2018, pp. 94-102, Available online May 10, 2018.

Thomas Cameron, "RF Technology for the 5G Millimeter Wave Radio," 2016.

Ericsson Mobility Report, Jun. 2018.

Theodore S. Rappaport et al., "Overview of Millimeter Wave Communications for Fifth-Generation (5G) Wireless Networks—With a Focus on Propagation Models," IEEE Transactions on Antennas and Propagation, vol. 65, No. 12, Dec. 2017, published Aug. 1, 2017.

Thomas Cameron, "Webcast: RF Technology for the 5G Millimeter Wave Radio," Sep. 27, 2018.

NGMN 5G White Paper, Feb. 17, 2015.

NASA UAS & UTM webpage, https://utm.arc.nasa.gov/index.shtml, accessed Oct. 1, 2020.

Karen Campbell et al., "IHS-Technology-5G-Economic-Impact-Study," Jan. 2017.

Fact Sheet—Small Unmanned Aircraft Regulations (Part 107), https://www.faa.gov/news/fact_sheets/news_story.cfm?newsId=22615, Jul. 23, 2018, accessed Oct. 1, 2020.

Ericsson, "Network Slicing can be a piece of cake," May 2018.

FCC, "Technological Advisory Council, Antenna Technologies, Working Group," Jun. 12, 2018.

Stefan Parkvall, "5G NR release 16—start of the 5G Evolution," Sep. 18, 2018, accessed Oct. 1, 2020.

SYSTEMS AND METHODS FOR DISTRIBUTED AVIONICS PROCESSING

CROSS-REFERENCE TO RELATED APPLICATION(S)

This patent application claims the benefit of priority under 35 U.S.C. § 119 from Indian Patent Application No. 201911044179, filed on Oct. 31, 2019, the contents of which is incorporated by reference in its entirety.

TECHNICAL FIELD

Various embodiments of the present disclosure relate generally to systems and methods for distributed vehicle processing and to systems and methods for distributed vehicle processing for supplemental navigation.

BACKGROUND

Avionics radios are currently based on radio standards specified by RTCA and/or ARINC and typically use voice or low data rates, while prioritizing Aviation safety. The civilian use of radio spectrum (cell phone networks) has developed on a different track which prioritizes efficiency of spectrum use and significantly higher data rates. However, as urban air mobility (UAM) vehicles are operating nearer to the surface than traditional avionics communications infrastructure, where cell phone networks are more accessible, so UAM vehicles may be able to make use cell phone networks. Furthermore, UAM vehicles may have constrained resource requirements (energy, payload, weight) while maintaining stringent safety standards. Therefore, it may be a challenge hosting numerous systems and relatively large software processing power on board UAM vehicles, while maintaining the stringent safety standards.

Moreover, navigation may be a significant challenge for UAM vehicles, as their typical operating environment is at low altitudes and with a vehicle density that is multifold compared to current day aviation. For instance, GPS availability may be limited or the signal quality significantly degraded in the UAM environment because of, e.g., canyon effects/poor visibility of GNSS signals, tall building and obstructions to name a few. Moreover, the UAM environment may include ground erected obstacles and poor visibility (e.g., due to smog/fog), which could impair both radio and optical ranging. Therefore, it may be a challenge to build an integrated low-cost navigation system even with the recent advances in communication, computing, and sensing technologies.

The present disclosure is directed to overcoming one or more of these above-referenced challenges.

SUMMARY OF THE DISCLOSURE

According to certain aspects of the disclosure, systems and methods are disclosed for distributed vehicle processing and distributed vehicle processing for supplemental navigation.

For instance, a method, for distributed vehicle processing for a vehicle, may include: determining whether one of a first set of trigger conditions, one of a second set of trigger conditions, or one of a third set of trigger conditions are satisfied; in response to determining a first trigger condition of the first set of trigger conditions is satisfied, performing a first process corresponding to the first trigger condition on-board the vehicle; in response to determining a second trigger condition of the second set of trigger conditions is satisfied, prompting a second process corresponding to the second trigger condition by transmitting an edge request to an edge node and receiving an edge response from the edge node; and in response to determining a third trigger condition of the third set of trigger conditions is satisfied, prompting a third process corresponding to the third trigger condition by transmitting a cloud request to a cloud node and receiving a cloud response from the cloud node.

Moreover, a system may comprise a memory storing instructions; and a processor executing the instructions to perform a process. The process including: determining whether one of a first set of trigger conditions, one of a second set of trigger conditions, or one of a third set of trigger conditions are satisfied; in response to determining a first trigger condition of the first set of trigger conditions is satisfied, performing a first process corresponding to the first trigger condition on-board the vehicle; in response to determining a second trigger condition of the second set of trigger conditions is satisfied, prompting a second process corresponding to the second trigger condition by transmitting an edge request to an edge node and receiving an edge response from the edge node; and in response to determining a third trigger condition of the third set of trigger conditions is satisfied, prompting a third process corresponding to the third trigger condition by transmitting a cloud request to a cloud node and receiving a cloud response from the cloud node.

Additionally, a non-transitory computer-readable medium storing instructions that, when executed by a processor, cause the processor to perform a method. The method may include: determining whether one of a first set of trigger conditions, one of a second set of trigger conditions, or one of a third set of trigger conditions are satisfied; in response to determining a first trigger condition of the first set of trigger conditions is satisfied, performing a first process corresponding to the first trigger condition on-board the vehicle; in response to determining a second trigger condition of the second set of trigger conditions is satisfied, prompting a second process corresponding to the second trigger condition by transmitting an edge request to an edge node and receiving an edge response from the edge node; and in response to determining a third trigger condition of the third set of trigger conditions is satisfied, prompting a third process corresponding to the third trigger condition by transmitting a cloud request to a cloud node and receiving a cloud response from the cloud node.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to systems and methods for distributed vehicle processing and to systems and methods for distributed vehicle processing for supplemental navigation.

In general, the present disclosure is directed to distributed processing for avionics functionality. For instance, the methods and systems of the present disclosure may enable partitioning and hosting avionics applications on low latency wireless networks (e.g., such as 5G networks) by offloading computation, storage and other data functions to processing entities on a wireless mobile network edge (such as in edge nodes with 5G communications and computing power in an urban environment). This method of partitioning and hosting avionics applications may have an advantage of reducing resource requirements (energy, payload, timing and processing budgets) on weight constrained aircraft, while maintaining stringent safety standards by keeping navigation and management at the edge nodes of the wireless mobile network edge. Therefore, by implementing avionics applications on the edge nodes, UAM vehicles may achieve better tradeoffs in battery, power, serviceable range, performance, and payloads. For instance, only actuation systems to operate a UAM vehicle, sensors (such as GPS, cameras, IRS, etc.), and the most-time-sensitive processing is hosted on the UAM vehicle, while relatively slower but tightly coupled processing (management, mission planning, navigation, etc.) may be performed on the edge nodes. Meanwhile, applications that can tolerate larger delays can be hosted on the cloud, such as mission payload data and analytics, etc.

For another aspect of the disclosure, the systems and methods of the present disclosure may provide cross-referenced supplemental navigation. For instance, edge nodes/ cloud nodes may cross-reference and error check known geographical patterns, cellular/beacon trilateration, ground radio based references, digital adaptive phased array radars (DAPA), known proximate vehicle positions, to supplement for a low accuracy autonomous navigation sensor.

While this disclosure describes the systems and methods with reference to aircraft, it should be appreciated that the present systems and methods are applicable to management of vehicles, including those of drones, automobiles, ships, or any other autonomous and/or Internet-connected vehicle.

Figure 1:
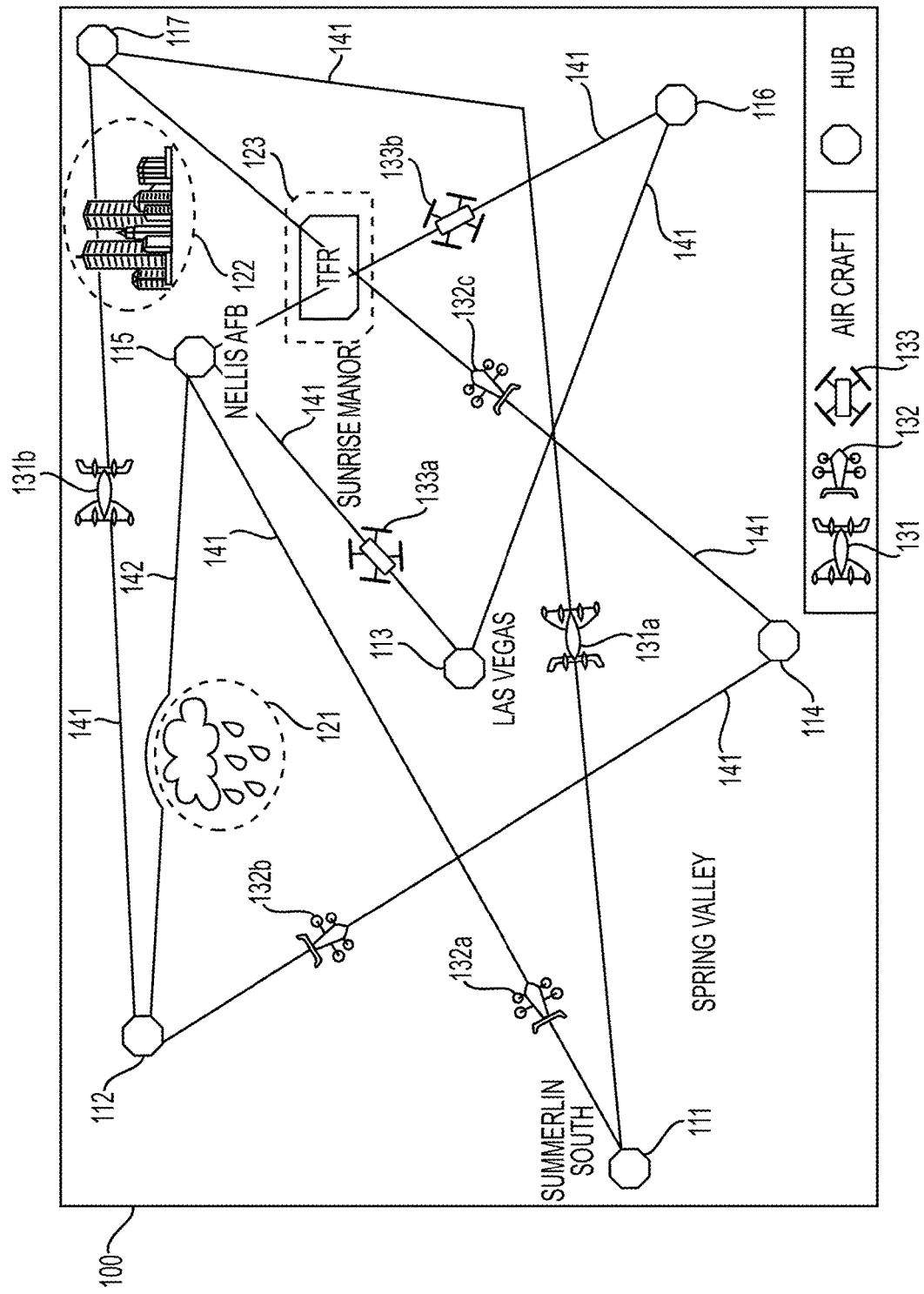
FIG. 1 depicts an example environment in which methods, systems, and other aspects of the present disclosure may be implemented.

As shown in FIG. 1, FIG. 1 depicts an example environment in which methods, systems, and other aspects of the present disclosure may be implemented. The environment of FIG. 1 may include an airspace 100 and one or more hubs 111-117. A hub, such as any one of 111-117, may be a ground facility where aircraft may take off, land, or remain parked (e.g., airport, vertiport, heliport, vertistop, helistop, temporary landing/takeoff facility, or the like). The airspace 100 may accommodate aircraft of various types 131-133 (collectively, "aircraft 131" unless indicated otherwise herein), flying at various altitudes and via various routes 141. An aircraft, such as any one of aircraft 131a-133b, may be any apparatus or vehicle of air transportation capable of traveling between two or more hubs 111-117, such as an airplane, a vertical take-off and landing aircraft (VTOL), a drone, a helicopter, an unmanned aerial vehicle (UAV), a hot-air balloon, a military aircraft, etc. Any one of the aircraft 131a-133b may be connected to one another and/or to one or more of the hubs 111-117, over a communication network, using a vehicle management computer corresponding to each aircraft or each hub. Each vehicle management computer may comprise a computing device and/or a communication device, as described in more detail below in FIGS. 3A and 3B. As shown in FIG. 1, different types of aircraft that share the airspace 100 are illustrated, which are distinguished, by way of example, as model 131 (aircraft 131a and 131b), model 132 (aircraft 132a, 132b, and 132c), and model 133 (aircraft 133a and 133b).

As further shown in FIG. 1, an airspace 100 may have one or more weather constraints 121, spatial restrictions 122 (e.g., buildings), and temporary flight restrictions (TFR) 123. These are exemplary factors that a vehicle management computer of an aircraft may be required to consider and/or analyze in order to derive the most safe and optimal flight trajectory of the aircraft. For example, if a vehicle management computer of an aircraft planning to travel from hub 112 to hub 115 predicts that the aircraft may be affected by an adverse weather condition, such as weather constraint 121, in the airspace, the vehicle management computer may modify a direct path (e.g., the route 141 between hub 112 and hub 115) with a slight curvature away from the weather constraint 121 (e.g., a northward detour) to form a deviated route 142. For instance, the deviated route 142 may ensure that the path and the time of the aircraft (e.g., 4-D coordinates of the flight trajectory) do not intersect any position and time coordinates of the weather constraint 121 (e.g., 4-D coordinates of the weather constraint 121).

As another example, the vehicle management computer of aircraft 131b may predict, prior to take-off, that spatial restriction 122, caused by buildings, would hinder the direct flight path of aircraft 131b flying from hub 112 to hub 117, as depicted in FIG. 1. In response to that prediction, the vehicle management computer of aircraft 131b may generate a 4-D trajectory with a vehicle path that bypasses a 3-dimensional zone (e.g., zone including the location and the altitude) associated with those particular buildings. As yet another example, the vehicle management computer of aircraft 133b may predict, prior to take-off, that TFR 123, as well as some potential 4-D trajectories of another aircraft 132c, would hinder or conflict with the direct flight path of aircraft 133b, as depicted in FIG. 1. In response, the vehicle management computer of aircraft 133b may generate a 4-D trajectory with path and time coordinates that do not intersect either the 4-D coordinates of the TFR 123 or the 4-D trajectory of the other aircraft 132c. In this case, the TFR 123 and collision risk with another aircraft 132c are examples of dynamic factors which may or may not be in effect, depending on the scheduled time of travel, the effective times of TFR, and the path and schedule of the other aircraft 132c. As described in these examples, the 4-D trajectory derivation process, including any modification or re-negotiation, may be completed prior to take-off of the aircraft.

As another example, the vehicle management computer of aircraft 131b may determine to use one of the routes 141 that are set aside for aircraft 131 to use, either exclusively or non-exclusively. The aircraft 131b may generate a 4-D trajectory with a vehicle path that follows one of the routes 141.

As indicated above, FIG. 1 is provided merely as an example environment of an airspace that includes exemplary types of aircraft, hubs, zones, restrictions, and routes. Regarding particular details of the aircraft, hubs, zones, restrictions, and routes, other examples are possible and may differ from what was described with respect to FIG. 1. For example, types of zones and restrictions which may become a factor in trajectory derivation, other than those described above, may include availability of hubs, reserved paths or sky lanes (e.g., routes 141), any ground-originating obstacle which extends out to certain levels of altitudes, any known zones of avoidance (e.g., noise sensitive zones), air transport regulations (e.g., closeness to airports), etc. Any factor that renders the 4-D trajectory to be modified from the direct or the shortest path between two hubs may be considered during the derivation process.

Figure 2:
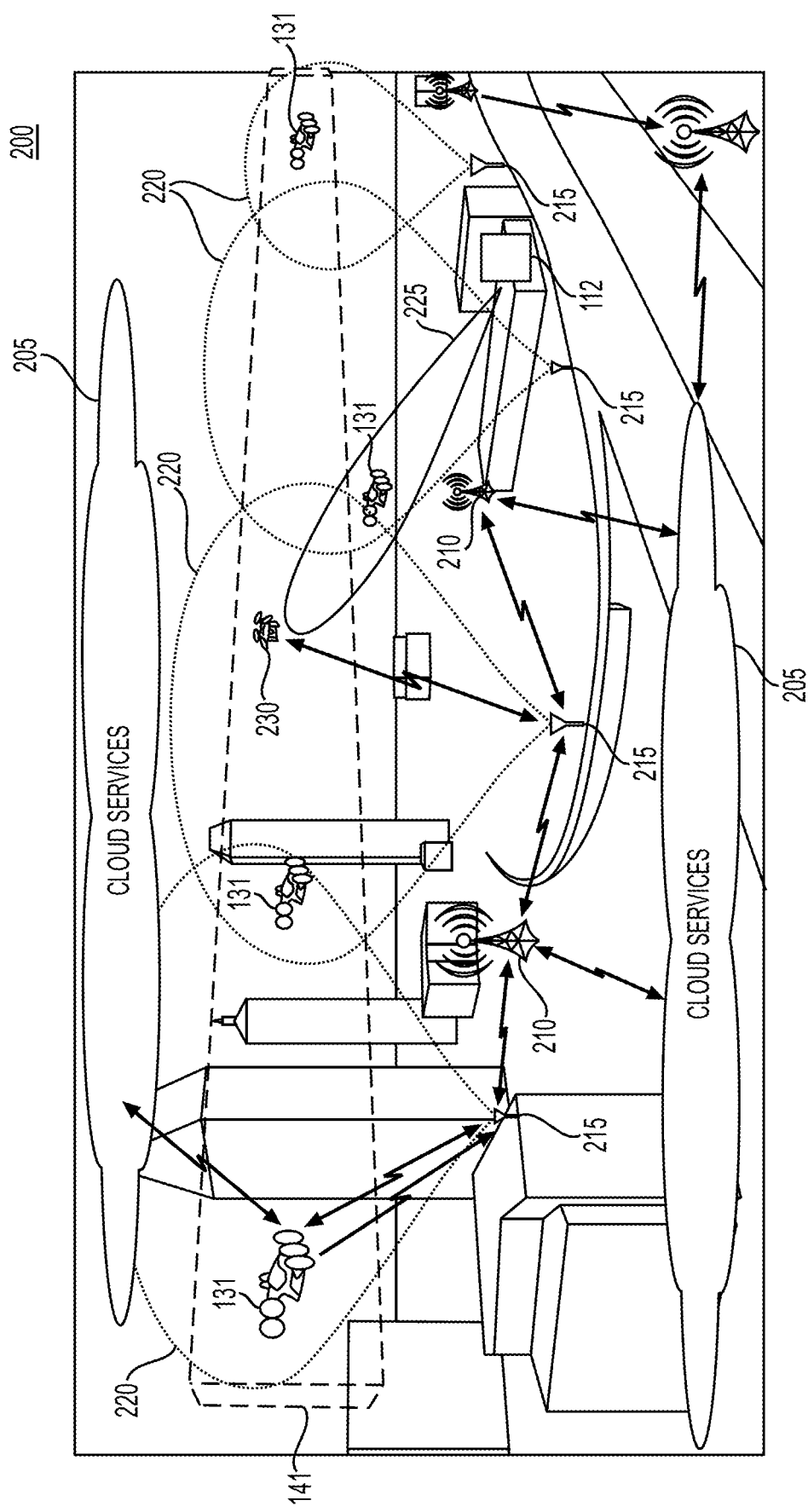
FIG. 2 depicts an exemplary a system, according to one or more embodiments.

FIG. 2 depicts an exemplary a system, according to one or more embodiments. The system 200 depicted in FIG. 2 may include one or more aircraft, such as aircraft 131, one or more intruder aircraft 230, a cloud service 205, one or more communications station(s) 210, and/or one or more ground station(s) 215. The one or more aircraft 131 may be traveling from a first hub (e.g., hub 114) to a second hub (e.g., hub 112) along a route of routes 141. Between, near, and/or on hubs, such as hubs 111-117, the one or more ground station(s) 215 may be distributed (e.g., evenly, based on traffic considerations, etc.) along/near/on/under routes 141. Between, near, and/or on hubs, such as hubs 111-117, the one or more communications station(s) 210 may be distributed (e.g., evenly, based on traffic considerations, etc.). Some (or all) of the one or more ground station(s) 215 may be paired with a communication station 210 of the one or more communications station(s) 210. Furthermore, the one or more ground station(s) 215 may include temporary communication systems that may be available to issues alerts of obstructions of the one or more ground station(s) 215, so that the obstruction can be removed, etc.

Each of the one or more ground station(s) 215 may include a transponder system, a radar system, and/or a datalink system.

The radar system of a ground station 215 may include a directional radar system. The directional radar system may be pointed upward (e.g., from ground towards sky) and the directional radar system may transmit a beam 220 to provide three-dimensional coverage over a section of a route 141. The beam 220 may be a narrow beam. The three-dimensional coverage of the beam 220 may be directly above the ground station 215 or at various skewed angles (from a vertical direction). The directional radar system may detect objects, such as aircraft 131, within the three-dimensional coverage of the beam 220. The directional radar system may detect objects by skin detection. In the case of the ground station 215 being positioned on a hub, such as the hub 112, the directional radar system may transmit a beam 225 to provide three-dimensional coverage over the hub 112. The beam 225 may be also be skewed at an angle (from a vertical direction) to detect objects arriving at, descending to, and landing on the hub 112. The beams 220/225 may be controlled either mechanically (by moving the radar system), electronically (e.g., phased arrays), or by software (e.g., digital phased array "DAPA" radars), or any combination thereof.

The transponder system of a ground station 215 may include an ADS-B and/or a Mode S transponder, and/or other transponder system (collectively, interrogator system). The interrogator system may have at least one directional antenna. The directional antenna may target a section of a route 141. For instance, targeting the section of the route 141 may reduce the likelihood of overwhelming the ecosystem (e.g., aircraft 131) with interrogations, as would be the case if the interrogator system used an omnidirectional antenna. The directional antenna may target a specific section of a route 141 by transmitting signals in a same or different beam pattern as the beam 220/225 discussed above for the radar system. The interrogator system may transmit interrogation messages to aircraft, such as aircraft 131, within the section of the route 141. The interrogation messages may include an identifier of the interrogator system and/or request the aircraft, such as aircraft 131, to transmit an identification message. The interrogator system may receive the identification message from the aircraft, such as aircraft 131. The identification message may include an identifier of the aircraft and/or transponder aircraft data (e.g., speed, location, track, etc.) of the aircraft.

If the radar system detects an object and the transponder system does not receive a corresponding identification message from the object (or does receive an identification message, but it is an invalid identification message, e.g., an identifier of un-authorized aircraft), the ground station 215 may determine that the object is an intruder aircraft 230. The ground station 215 may then transmit an intruder alert message to the cloud service 205. If the radar system detects an object and the transponder system receives a corresponding identification message from the object, the ground station 215 may determine the object is a valid aircraft. The ground station 215 may then transmit a valid aircraft message to the cloud service 205. Additionally or alternatively, the ground station 215 may transmit a detection message based on the detection of the object and whether the ground station 215 receives the identification message ("a response message"); therefore, the ground station 215 may not make a determination as to whether the detected object is an intruder aircraft or a valid aircraft, but instead send the detection message to the cloud service 205 for the cloud service 205 to determine whether the detected object is an intruder aircraft or a valid aircraft.

The datalink system of ground station 215 may communicate with at least one of the one or more communications station(s) 210. Each of the one or more communications station(s) 210 may communicate with at least one of the one or more ground station(s) 215 within a region around the communications station 210 to receive and transmit data from/to the one or more ground station(s) 215. Some or none of the communications station(s) 210 may not communicate directly with the ground station(s) 215, but may instead be relays from other communications station(s) 210 that are in direct communication with the ground station(s) 215. For instance, each of the ground station(s) 215 may communicate with a nearest one of the communications station(s) 210 (directly or indirectly). Additionally or alternatively, the ground station(s) 215 may communicate with a communications station 210 that has a best signal to the ground station 215, best bandwidth, etc. The one or more communications station(s) 210 may include a wireless communication system to communicate with the datalink system of ground station(s) 215. The wireless communication system may enable cellular communication, in accordance with, e.g., 3G/4G/5G standards. The wireless communication system may enable Wi-Fi communications, Bluetooth communications, or other short range wireless communications. Additionally or alternatively, the one or more communications station(s) 210 may communicate with the one or more of the one or more ground station(s) 215 based on wired communication, such as Ethernet, fiber optic, etc.

For instance, a ground station 215 may transmit an intruder alert message or a valid aircraft message (and/or a detection message) to a communications station 210. The communications station 210 may then relay the intruder alert message or the valid aircraft message (and/or the detection message) to the cloud service 205 (either directly or indirectly through another communications station 210).

The one or more communications station(s) 210 may also communicate with one or more aircraft, such as aircraft 131, to receive and transmit data from/to the one or more aircraft. For instance, one or more communications station(s) 210 may relay data between the cloud service 205 and a vehicle, such as aircraft 131.

The cloud service 205 may communicate with the one or more communications station(s) 210 and/or directly (e.g., via satellite communications) with aircraft, such as aircraft 131. The cloud service 205 may provide instructions, data, and/or warnings to the aircraft 131. The cloud service 205 may receive acknowledgements from the aircraft 131, aircraft data from the aircraft 131, and/or other information from the aircraft 131. For instance, the cloud service 205 may provide, to the aircraft 131, weather data, traffic data, landing zone data for the hubs, such as hubs 111-117, updated obstacle data, flight plan data, etc. The cloud service 205 may also provide software as a service (SaaS) to aircraft 131 to perform various software functions, such as navigation services, Flight Management System (FMS) services, etc., in accordance with service contracts, API requests from aircraft 131, etc.

Figure 3A:
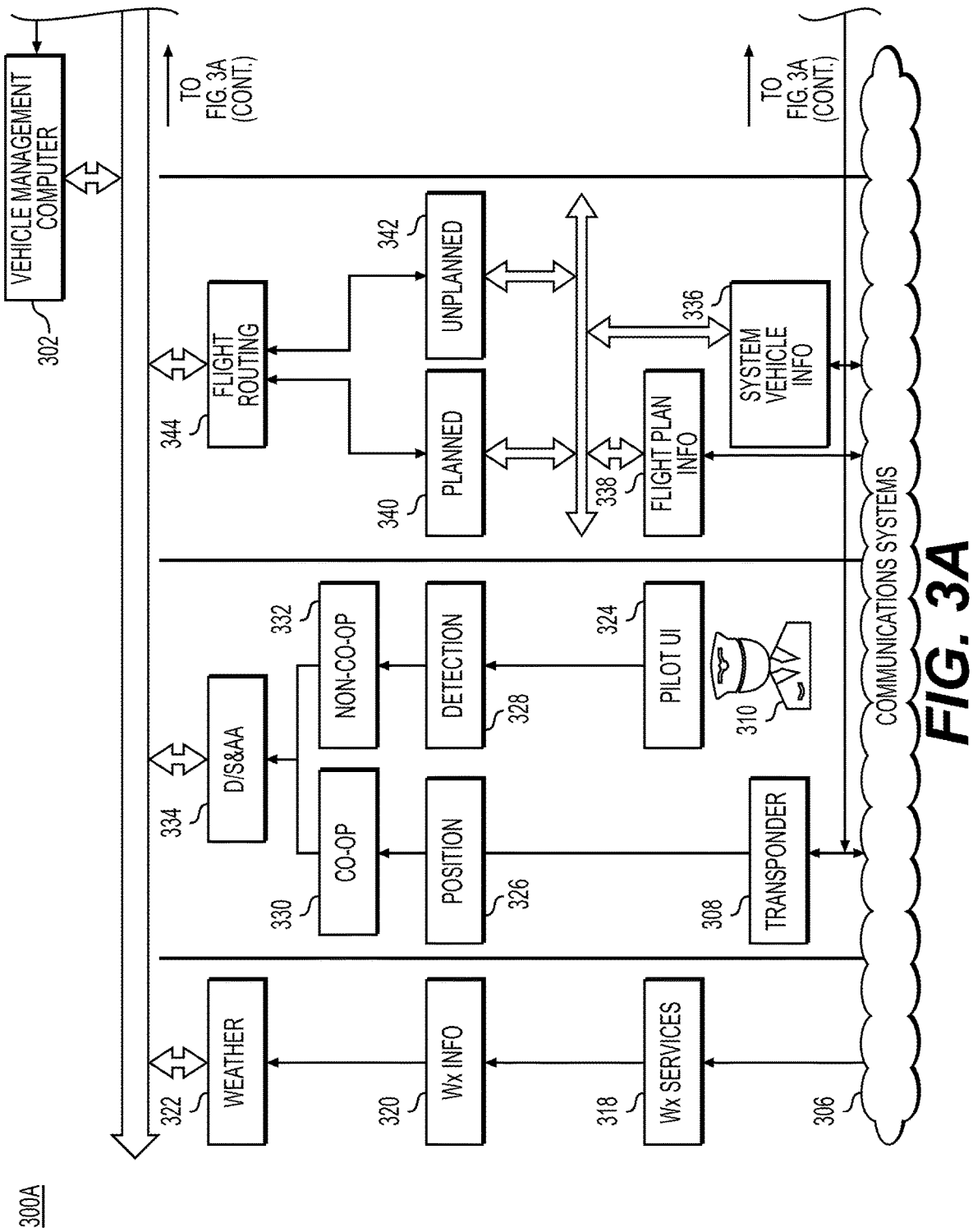
FIGS. 3A and 3B depict exemplary block diagrams of a vehicle of a system, according to one or more embodiments.
Figure 3A:
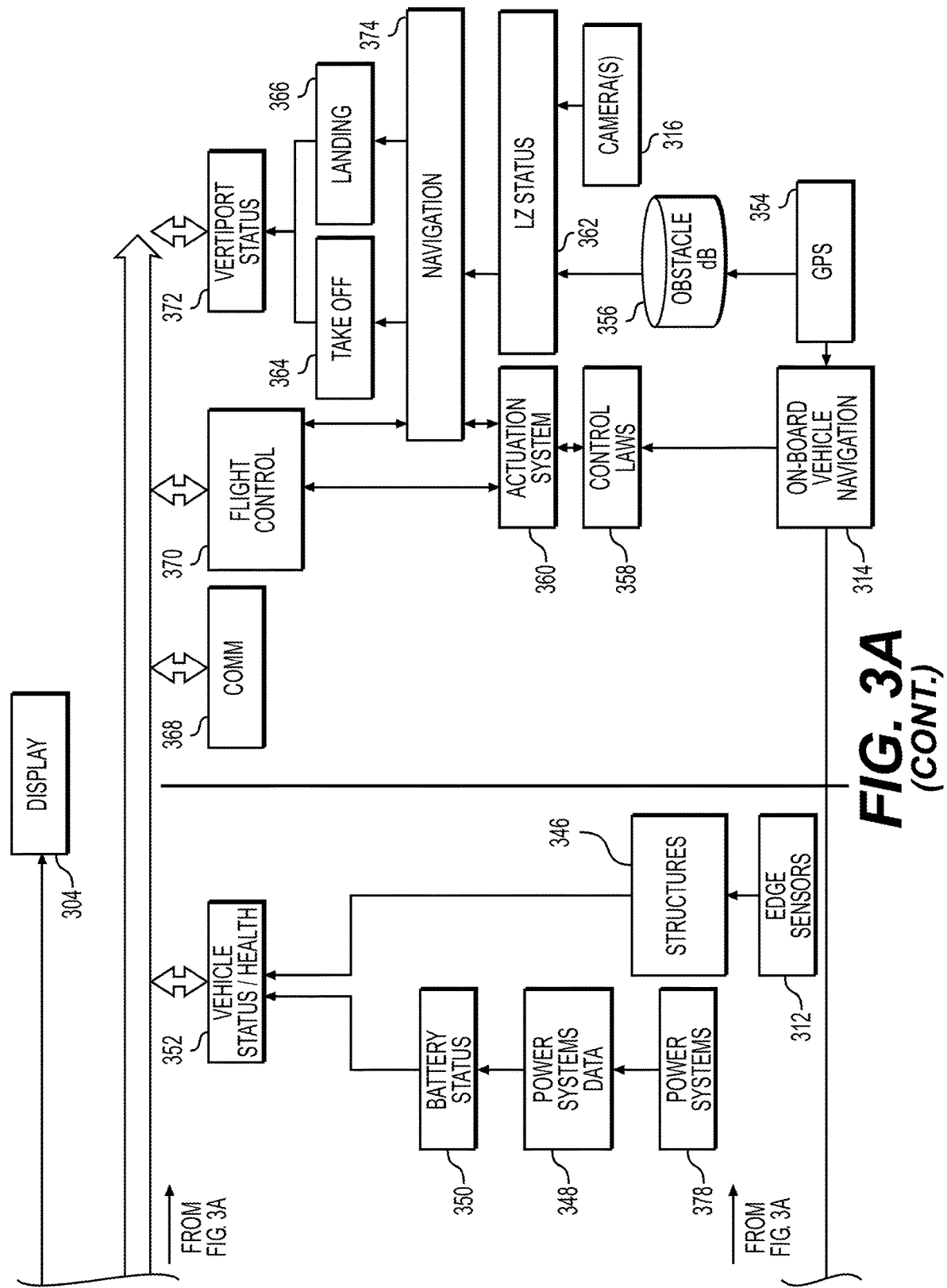
Figure 3B:
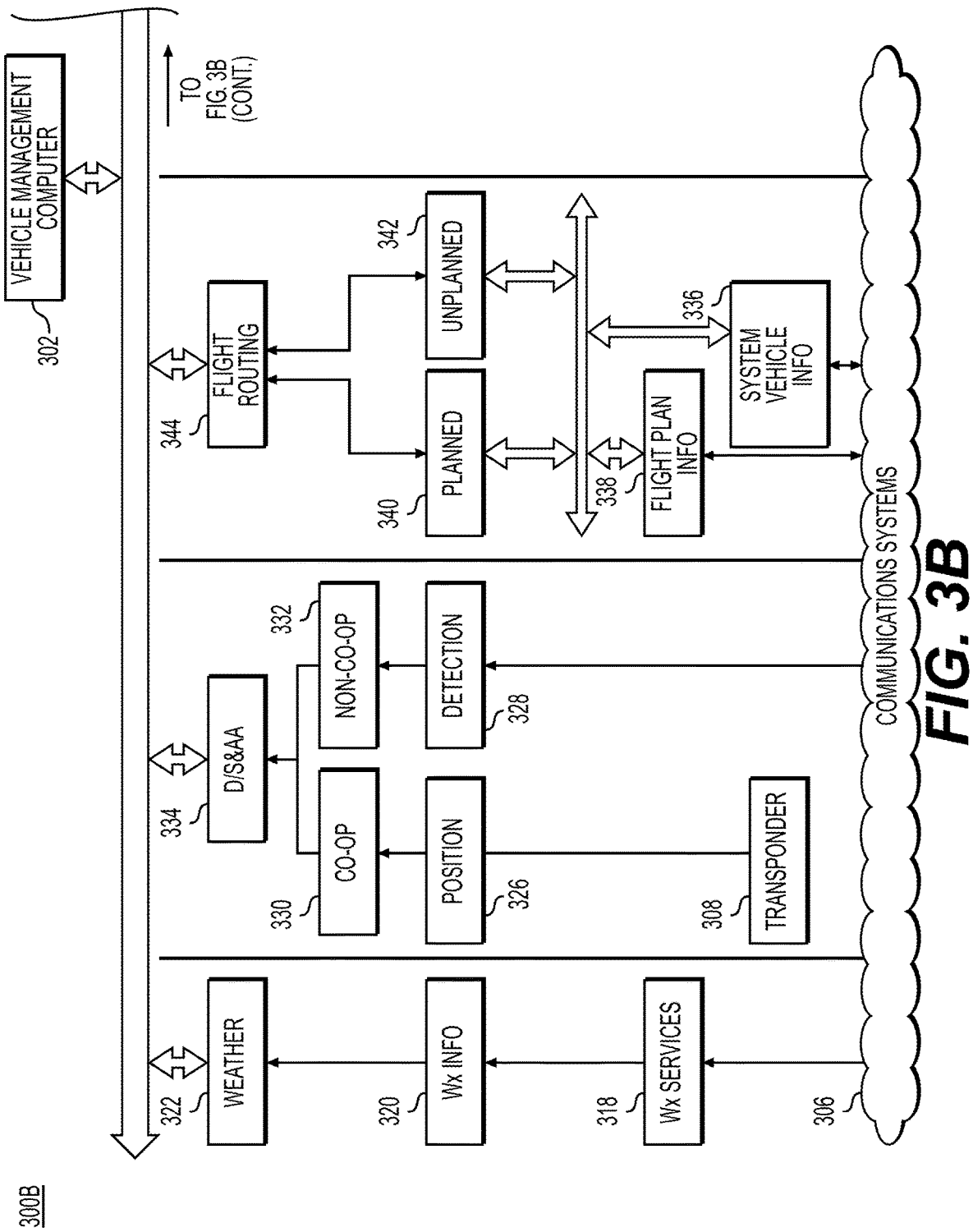
Figure 3B:
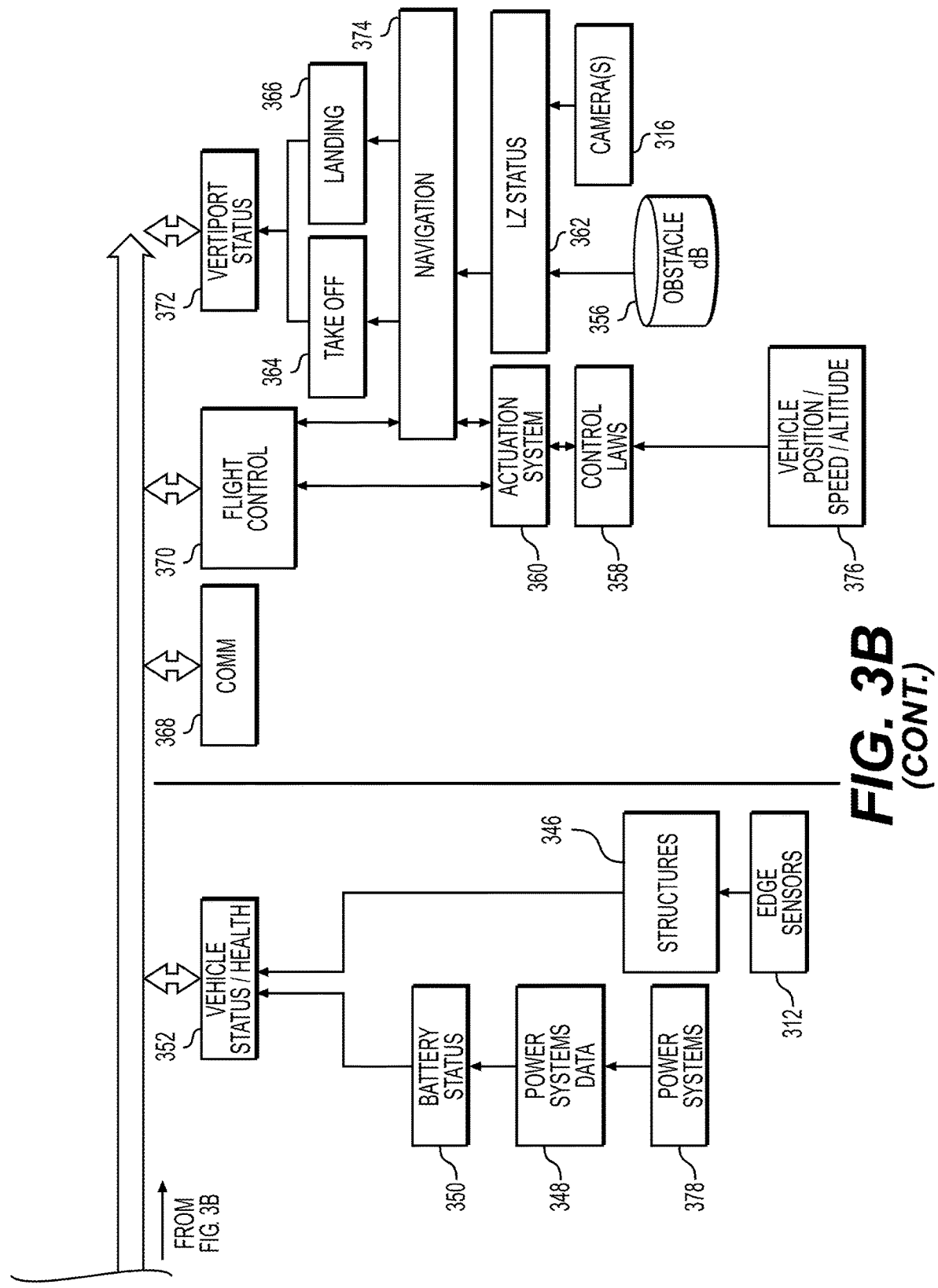

FIGS. 3A and 3B depict exemplary block diagrams of a vehicle of a system, according to one or more embodiments. FIG. 3A may depict a block diagram 300A and FIG. 3B may depict a block diagram 300B, respectively, of a vehicle, such as aircraft 131-133. Generally, the block diagram 300A may depict systems, information/data, and communications between the systems of a piloted or semi-autonomous vehicle, while the block diagram 300B may depict systems, information/data, and communications between the systems of a fully autonomous vehicle. The aircraft 131 may be one of the piloted or semi-autonomous vehicle and/or the fully autonomous vehicle.

The block diagram 300A of an aircraft 131 may include a vehicle management computer 302 and electrical, mechanical, and/or software systems (collectively, "vehicle systems"). The vehicle systems may include: one or more display(s) 304; communications systems 306; one or more transponder(s) 308; pilot/user interface(s) 324 to receive and communicate information from pilots and/or users 310 of the aircraft 131; edge sensors 312 on structures 346 of the aircraft 131 (such as doors, seats, tires, etc.); power systems 378 to provide power to actuation systems 360; camera(s) 316; GPS systems 354; on-board vehicle navigation systems 314; flight control computer 370; and/or one or more data storage systems. The vehicle management computer 302 and the vehicle systems may be connected by one or a combination of wired or wireless communication interfaces, such as TCP/IP communication over Wi-Fi or Ethernet (with or without switches), RS-422, ARINC-429, or other communication standards (with or without protocol switches, as needed). Generally, the GPS systems 354, the on-board vehicle navigation systems 314 (collectively or individual components thereof, discussed below), the one or more transponder(s) 308, and/or the camera(s) 316 (collectively or individual components thereof, discussed below) may be considered a situational awareness system. The situational awareness system may determine: vehicle state (position, speed, orientation, heading, etc. of the navigation information discussed below) and tracking information for nearby entities (airborne vehicles/objects, ground terrain, and/or physical infrastructure, etc. of the imaging output data, data from the one or more transponder(s) 308, and/or the radar data of the navigation information, discussed below) that may encroach a safety envelope of a vehicle 131. The situational awareness system may provide the vehicle state and tracking information to the vehicle management computer 302. The vehicle management computer 302 may use the vehicle state and tracking information to control the actuation systems 360, in accordance with the flight control program 370 and/or the vertiport status program 372, as discussed below.

The vehicle management computer 302 may include at least a network interface, a processor, and a memory, each coupled to each other via a bus or indirectly via wired or wireless connections (e.g., Wi-Fi, Ethernet, parallel or serial ATA, etc.). The memory may store, and the processor may execute, a vehicle management program. The vehicle management program may include a weather program 322, a Detect/Sense and Avoid (D/S & A) program 334, a flight routing program 344, a vehicle status/health program 352, a communications program 368, a flight control program 370, and/or a vertiport status program 372 (collectively, "sub-programs"). The vehicle management program may obtain inputs from the sub-programs and send outputs to the sub-programs to manage the aircraft 131, in accordance with program code of the vehicle management program. The vehicle management program may also obtain inputs from the vehicle systems and output instructions/data to the vehicle systems, in accordance with the program code of the vehicle management program.

The vehicle management computer 302 may transmit instructions/data/graphical user interface(s) to the one or more display(s) 304 and/or the pilot/user interface(s) 324. The one or more display(s) 304 and/or the pilot/user interface(s) 324 may receive user inputs, and transmit the user inputs to the vehicle management computer 302.

The communications systems 306 may include various data links systems (e.g., satellite communications systems), cellular communications systems (e.g., LTE, 4G, 5G, etc.), radio communications systems (e.g., HF, VHF, etc.), and/or wireless local area network communications systems (e.g., Wi-Fi, Bluetooth, etc.). The communications systems 306 may also include encryption/decryption functions. The encryption/decryption functions may (1) encrypt outgoing data/messages so that receiving entities may decrypt the outgoing data/messages, while intervening entities may not gain access to the data/messages; and (2) decrypt incoming data/messages so that transmitting entities may encrypt the incoming data/messages, while intervening entities may not gain access to the data/messages. The communications systems 306 may enable communications, in accordance with the communications program 368, between the aircraft 131 and external networks, services, and the cloud service 205, discussed above. An example of the external networks may include a wide area network, such as the internet. Examples of the services may include weather information services 318, traffic information services, etc.

The one or more transponder(s) 308 may include an interrogator system. The interrogator system of the aircraft 131 may be an ADS-B, a Mode S transponder, and/or other transponder system. The interrogator system may have an omnidirectional antenna and/or a directional antenna (interrogator system antenna). The interrogator system antenna may transmit/receive signals to transmit/receive interrogation messages and transmit/receive identification messages. For instance, in response to receiving an interrogation message, the interrogator system may obtain an identifier of the aircraft 131 and/or transponder aircraft data (e.g., speed, location, track, etc.) of the aircraft 131, e.g., from the on-board vehicle navigation systems 314; and transmit an identification message. Contra-wise, the interrogator system may transmit interrogation messages to nearby aircraft; and receive identification messages. The one or more transponder(s) 308 may send messages to the vehicle management computer 302 to report interrogation messages and/or identification messages received from/transmitted to other aircraft and/or the ground station(s) 215. As discussed above, the interrogation messages may include an identifier of the interrogator system (in this case, the aircraft 131), request the nearby aircraft to transmit an identification message, and/or (different than above) transponder aircraft data (e.g., speed, location, track, etc.) of the aircraft 131; the identification message may include an identifier of the aircraft 131 and/or the transponder aircraft data of the aircraft 131.

The edge sensors 312 on the structures 346 of the aircraft 131 may be sensors to detect various environmental and/or system status information. For instance, some of the edge sensors 312 may monitor for discrete signals, such as edge sensors on seats (e.g., occupied or not), doors (e.g., closed or not), etc. of the aircraft 131. Some of the edge sensors 312 may monitor continuous signals, such as edge sensors on tires (e.g., tire pressure), brakes (e.g., engaged or not, amount of wear, etc.), passenger compartment (e.g., compartment air pressure, air composition, temperature, etc.), support structure (e.g., deformation, strain, etc.), etc., of the aircraft 131. The edge sensors 312 may transmit edge sensor data to the vehicle management computer 302 to report the discrete and/or continuous signals.

The power systems 378 may include one or more battery systems, fuel cell systems, and/or other chemical power systems to power the actuation systems 360 and/or the vehicle systems in general. In one aspect of the disclosure, the power systems 378 may be a battery pack. The power systems 378 may have various sensors to detect one or more of temperature, fuel/electrical charge remaining, discharge rate, etc. (collectively, power system data 348). The power systems 378 may transmit power system data 348 to the vehicle management computer 302 so that power system status 350 (or battery pack status) may be monitored by the vehicle status/health program 352.

The actuation systems 360 may include: motors, engines, and/or propellers to generate thrust, lift, and/or directional force for the aircraft 131; flaps or other surface controls to augment the thrust, lift, and/or directional force for the aircraft 131; and/or aircraft mechanical systems (e.g., to deploy landing gear, windshield wiper blades, signal lights, etc.). The vehicle management computer 302 may control the actuation systems 360 by transmitting instructions, in accordance with the flight control program 370, and the actuation systems 360 may transmit feedback/current status of the actuation systems 360 to the vehicle management computer 302 (which may be referred to as actuation systems data).

The camera(s) 316 may include inferred or optical cameras, LIDAR, or other visual imaging systems to record internal or external environments of the aircraft 131. The camera(s) 316 may obtain inferred images; optical images; and/or LIDAR point cloud data, or any combination thereof (collectively "imaging data"). The LIDAR point cloud data may include coordinates (which may include, e.g., location, intensity, time information, etc.) of each data point received by the LIDAR. The camera(s) 316 and/or the vehicle management computer 302 may include a machine vision function. The machine vision function may process the obtained imaging data to detect objects, locations of the detected objects, speed/velocity (relative and/or absolute) of the detected objects, size and/or shape of the detected objects, etc. (collectively, "machine vision outputs"). For instance, the machine vision function may be used to image a landing zone to confirm the landing zone is clear/unobstructed (a landing zone (LZ) status 362). Additionally or alternatively, the machine vision function may determine whether physical environment (e.g., buildings, structures, cranes, etc.) around the aircraft 131 and/or on/near the routes 141 may be or will be (e.g., based on location, speed, flight plan of the aircraft 131) within a safe flight envelope of the aircraft 131. The imaging data and/or the machine vision outputs may be referred to as "imaging output data." The camera(s) 316 may transmit the imaging data and/or the machine vision outputs of the machine vision function to the vehicle management computer 302. The camera(s) 316 may determine whether elements detected in the physical environment are known or unknown based on obstacle data stored in an obstacle database 356, such as by determining a location of the detected object and determining if an obstacle in the obstacle database has the same location (or within a defined range of distance). The imaging output data may include any obstacles determined to not be in the obstacle data of the obstacle database 356 (unknown obstacles information).

The GPS systems 354 may include one or more global navigation satellite (GNSS) receivers. The GNSS receivers may receive signals from the United States developed Global Position System (GPS), the Russian developed Global Navigation Satellite System (GLONASS), the European Union developed Galileo system, and/or the Chinese developed BeiDou system, or other global or regional satellite navigation systems. The GNSS receivers may determine positioning information for the aircraft 131. The positioning information may include information about one or more of position (e.g., latitude and longitude, or Cartesian coordinates), altitude, speed, heading, or track, etc. for the vehicle. The GPS systems 354 may transmit the positioning information to the on-board vehicle navigation systems 314 and/or to the vehicle management computer 302.

The on-board vehicle navigation systems 314 may include one or more radar(s), one or more magnetometer(s), an attitude heading reference system (AHRS), and/or one or more air data module(s). The one or more radar(s) may be weather radar(s) to scan for weather and/or light weight digital radar(s), such as DAPA radar(s) (either omnidirectional and/or directional), to scan for terrain/ground/objects/obstacles. The one or more radar(s) may obtain radar information. The radar information may include information about the local weather and the terrain/ground/objects/obstacles (e.g., aircraft or obstacles and associated locations/movement). The one or more magnetometer(s) may measure magnetism to obtain bearing information for the aircraft 131. The AHRS may include sensors (e.g., three sensors on three axes) to obtain attitude information for the aircraft 131. The attitude information may include roll, pitch, and yaw of the aircraft 131. The air data module(s) may sense external air pressure to obtain airspeed information for the aircraft 131. The radar information, the bearing information, the attitude information, airspeed information, and/or the positioning information (collectively, navigation information) may be transmitted to the vehicle management computer 302.

The weather program 322 may, using the communications systems 306, transmit and/or receive weather information from one or more of the weather information services 318. For instance, the weather program 322 may obtain local weather information from weather radars and the on-board vehicle navigation systems 314, such as the air data module(s). The weather program may also transmit requests for weather information 320. For instance, the request may be for weather information 320 along a route 141 of the aircraft 131 (route weather information). The route weather information may include information about precipitation, wind, turbulence, storms, cloud coverage, visibility, etc. of the external environment of the aircraft 131 along/near a flight path, at a destination and/or departure location (e.g., one of the hubs 111-117), or for a general area around the flight path, destination location, and/or departure location. The one or more of the weather information services 318 may transmit responses that include the route weather information. Additionally or alternatively, the one or more of the weather information services 318 may transmit update messages to the aircraft 131 that includes the route weather information and/or updates to the route weather information.

The D/S & A program 334 may, using the one or more transponders 308 and/or the pilot/user interface(s) 324, detect and avoid objects that may pose a potential threat to the aircraft 131. As an example, the pilot/user interface(s) 324 may receive user input(s) from the pilots and/or users of the vehicle 310 (or radar/imaging detection) to indicate a detection of an object; the pilot/user interface(s) 324 (or radar/imaging detection) may transmit the user input(s) (or radar or imaging information) to the vehicle management computer 302; the vehicle management computer 302 may invoke the D/S & A program 334 to perform an object detection process 328 to determine whether the detected object is a non-cooperative object 332 (e.g., it is an aircraft that is not participating in transponder communication); optionally, the vehicle management computer 302 may determine a position, speed, track for the non-cooperative object 332 (non-cooperative object information), such as by radar tracking or image tracking; in response to determining the object is a non-cooperative object 332, the vehicle management computer 302 may determine a course of action, such as instruct the flight control program 370 to avoid the non-cooperative object 332. As another example, the one or more transponder(s) 308 may detect an intruder aircraft (such as intruder aircraft 230) based on an identification message from the intruder aircraft; the one or more transponder(s) 308 may transmit a message to the vehicle management computer 302 that includes the identification message from the intruder aircraft; the vehicle management computer 302 may extract an identifier and/or transponder aircraft data from the identification message to obtain the identifier and/or speed, location, track, etc. of the intruder aircraft; the vehicle management computer 302 may invoke the D/S & A program 334 to perform a position detection process 326 to determine whether the detected object is a cooperative object 330 and its location, speed, heading, track, etc.; in response to determining the object is a cooperative object 330, the vehicle management computer 302 may determine a course of action, such as instruct the flight control program 370 to avoid the cooperative object 330. For instance, the course of action may be different or the same for non-cooperative and cooperative objects 330/332, in accordance with rules based on regulations and/or scenarios.

The flight routing program 344 may, using the communications systems 306, generate/receive flight plan information 338 and receive system vehicle information 336 from the cloud service 205. The flight plan information 338 may include a departure location (e.g., one of the hubs 111-117), a destination location (e.g., one of the hubs 111-117), intermediate locations (if any) (e.g., waypoints or one or more of the hubs 111-117) between the departure and destination locations, and/or one or more routes 141 to be used (or not used). The system vehicle information 336 may include other aircraft positioning information for other aircraft with respect to the aircraft 131 (called a "receiving aircraft 131" for reference). For instance, the other aircraft positioning information may include positioning information of the other aircraft. The other aircraft may include: all aircraft 131-133 and/or intruder aircraft 230; aircraft 131-133 and/or intruder aircraft 230 within a threshold distance of the receiving aircraft 131; aircraft 131-133 and/or intruder aircraft 230 using a same route 141 (or is going to use the same route 141 or crossing over the same route 141) of the receiving aircraft; and/or aircraft 131-133 and/or intruder aircraft 230 within a same geographic area (e.g., city, town, metropolitan area, or sub-division thereof) of the receiving aircraft.

The flight routing program 344 may determine or receive a planned flight path 340. The flight routing program 344 may receive the planned flight path 340 from another aircraft 131 or the cloud service 205 (or other service, such as an operating service of the aircraft 131). The flight routing program 344 may determine the planned flight path 340 using various planning algorithms (e.g., flight planning services on-board or off-board the aircraft 131), aircraft constraints (e.g., cruising speed, maximum speed, maximum/minimum altitude, maximum range, etc.) of the aircraft 131, and/or external constraints (e.g., restricted airspace, noise abatement zones, etc.). The planned/received flight path may include a 4-D trajectory of a flight trajectory with 4-D coordinates, a flight path based on waypoints, any suitable flight path for the aircraft 131, or any combination thereof, in accordance with the flight plan information 338 and/or the system vehicle information 336. The 4-D coordinates may include 3-D coordinates of space (e.g., latitude, longitude, and altitude) for a flight path and time coordinate.

The flight routing program 344 may determine an unplanned flight path 342 based on the planned flight path 340 and unplanned event triggers, and using the various planning algorithms, the aircraft constraints of the aircraft 131, and/or the external constraints. The vehicle management computer 302 may determine the unplanned event triggers based on data/information the vehicle management compute 302 receives from other vehicle systems or from the cloud service 205. The unplanned event triggers may include one or a combination of: (1) emergency landing, as indicated by the vehicle status/health program 352 discussed below or by a user input to one or more display(s) 304 and/or the pilot/user interface(s) 324; (2) intruder aircraft 230, cooperative object 330, or non-cooperative object 332 encroaching on a safe flight envelope of the aircraft 131; (3) weather changes indicated by the route weather information (or updates thereto); (4) the machine vision outputs indicating a portion of the physical environment may be or will be within the safe flight envelope of the aircraft 131; and/or (5) the machine vision outputs indicating a landing zone is obstructed.

Collectively, the unplanned flight path 342/the planned flight path 340 and other aircraft positioning information may be called flight plan data.

The vehicle status/health program 352 may monitor vehicle systems for status/health, and perform actions based on the monitored status/health, such as periodically report status/health, indicate emergency status, etc. The vehicle may obtain the edge sensor data and the power system data 348. The vehicle status/health program 352 may process the edge sensor data and the power system data 348 to determine statuses of the power system 378 and the various structures and systems monitored by the edge sensors 312, and/or track a health of the power system 378 and structures and systems monitored by the edge sensors 312. For instance, the vehicle status/health program 352 may obtain the power systems data 348; determine a battery status 350; and perform actions based thereon, such as reduce consumption of non-essential systems, report battery status, etc. The vehicle status/health program 352 may determine an emergency landing condition based on one or more of the power system 378 and structures and systems monitored by the edge sensors 312 has a state that indicates the power system 378 and structures and systems monitored by the edge sensors 312 has or will fail soon. Moreover, the vehicle status/health program 352 may transmit status/health data to the cloud service 205 as status/health messages (or as a part of other messages to the cloud service). The status/health data may include the actuation systems data, all of the edge sensor data and/or the power system data, portions thereof, summaries of the edge sensor data and the power system data, and/or system status indicators (e.g., operating normal, degraded wear, inoperable, etc.) based on the edge sensor data and the power system data.

The flight control program 370 may control the actuation system 360 in accordance with the unplanned flight path 342/the planned flight path 340, the other aircraft positioning information, control laws 358, navigation rules 374, and/or user inputs (e.g., of a pilot if aircraft 131 is a piloted or semi-autonomous vehicle). The flight control program 370 may receive the planned flight path 340/unplanned flight path 342 and/or the user inputs (collectively, "course"), and determine inputs to the actuation system 360 to change speed, heading, attitude of the aircraft 131 to match the course based on the control laws 358 and navigation rules 374. The control laws 358 may dictate a range of actions possible of the actuation system 360 and map inputs to the range of actions to effectuate the course by, e.g., physics of flight of the aircraft 131. The navigation rules 374 may indicate acceptable actions based on location, waypoint, portion of flight path, context, etc. (collectively, "circumstance"). For instance, the navigation rules 374 may indicate a minimum/maximum altitude, minimum/maximum speed, minimum separation distance, a heading or range of acceptable headings, etc. for a given circumstance.

The vertiport status program 372 may control the aircraft 131 during take-off (by executing a take-off process 364) and during landing (by executing a landing process 366). The take-off process 364 may determine whether the landing zone from which the aircraft 131 is to leave and the flight environment during the ascent is clear (e.g., based on the control laws 358, the navigation rules 374, the imaging data, the obstacle data, the unplanned flight path 342/the planned flight path 340, the other aircraft positioning information, user inputs, etc.), and control the aircraft or guide the pilot through the ascent (e.g., based on the control laws 358, the navigation rules 374, the imaging data, the obstacle data, the flight plan data, user inputs, etc.). The landing process 366 may determine whether the landing zone on which the aircraft 131 is to land and the flight environment during the descent is clear (e.g., based on the control laws 358, the navigation rules 374, the imaging data, the obstacle data, the flight plan data, user inputs, the landing zone status, etc.), and control the aircraft or guide the pilot through the descent (e.g., based on the control laws 358, the navigation rules 374, the imaging data, the obstacle data, the flight plan data, user inputs, the landing zone status, etc.).

The one or more data storage systems may store data/information received, generated, or obtained onboard the aircraft. The one or more data storage systems may also store software for one or more of the computers onboard the aircraft.

The block diagram 300B may be the same as the block diagram 300A, but the block diagram 300B may omit the pilot/user interface(s) 324 and/or the one or more displays 304, and include a vehicle position/speed/altitude system 376. The vehicle position/speed/altitude system 376 may include or not include the on-board vehicle navigation systems 314 and/or the GPS systems 354, discussed above. In the case that the vehicle position/speed/altitude system 376 does not include the on-board vehicle navigation systems 314 and/or the GPS systems 354, the vehicle position/speed/altitude system 376 may obtain the navigation information from the cloud service 205.

Figure 4:
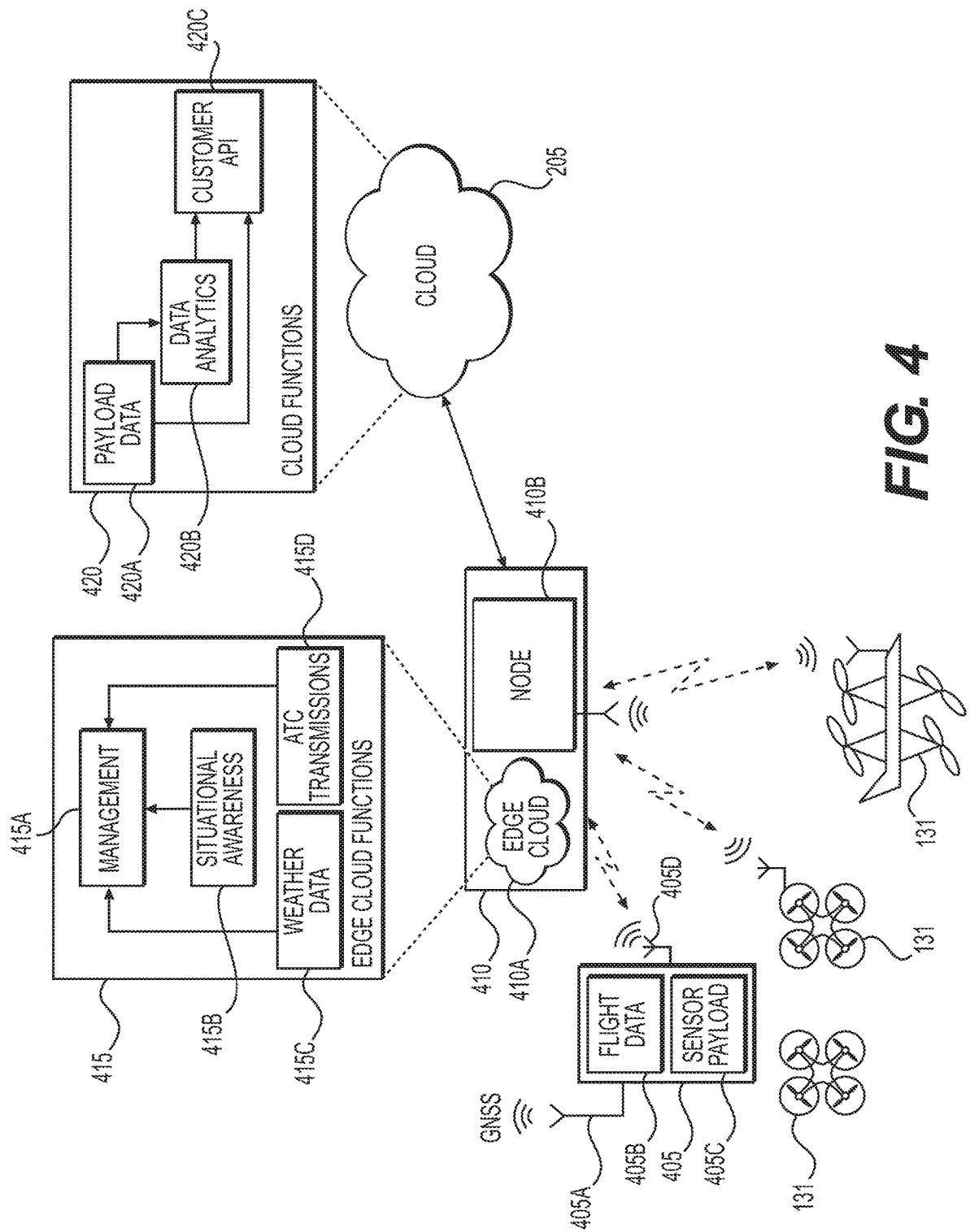
FIG. 4 depicts an exemplary a system for distributed avionics processing, according to one or more embodiments.

FIG. 4 may depict an exemplary system 400 for distributed avionics processing, according to one or more embodiments. The system 400 for distributed avionics processing may be the same as the system 200 depicted in FIG. 2, except that the system 400 is illustrative of how the aircraft 131/vehicle 405, edge nodes 410, and the cloud service 205 (hereinafter referred to as "cloud node 205") distribute avionics/vehicle processing to operate the aircraft 131/vehicle 405. The aircraft 131/vehicle 405, the edge nodes 410, and the cloud node 205 may each host functionality for the aircraft 131. In this manner, the vehicle 405 may include all of the features of the aircraft 131 discussed above (while off-boarding some/all data storage and/or some/all non-essential local processing functions as, e.g., processing power savings, memory savings, and/or redundancy), or include less physical infrastructure/software infrastructure and rely on the off-boarding processes to provide the corresponding functionality.

Specifically, the system 400 may be illustrative of partitioning and hosting avionics applications on low latency wireless networks (e.g., such as 5G networks) by offloading computation, storage and other data functions to processing entities on a wireless mobile network edge (such as edge nodes 410). This method of partitioning and hosting avionics applications may have an advantage of reducing resource requirements (energy, payload, timing constraints) on weight constrained aircraft, such as aircraft 131 or vehicle 405, used for urban air mobility.

Onboard GNSS, inertial navigation system (IRS), visual sensors (e.g., cameras, LiDAR, etc.), and radio aids (e.g., transponders, radar, etc.) contribute to situational awareness and contribute to maintaining safety of aircraft, such as aircraft 131 and/or vehicle 405. Current piloted systems have line replaceable units (LRUs) carried on-board to process these inputs and help a pilot ensure safe aviation and navigation. However, for UAM, as mentioned above, aircraft, such as aircraft 131 and/or the vehicle 405, may be restricted in space/weight/power. Therefore, to maintain situational awareness and safety, UAM vehicles may host minimal sensor and compute equipment on the aircraft 131/vehicle 405 and use high-speed low-latency wireless communications to perform processing activities on edge nodes 410.

Furthermore, current aviation radios may be severely limited in capacity with the expected automation and reduced human intervention in managing UAM type systems. For instance, both controlling systems on ground and piloting systems on aircraft are expected to consume massive amounts of navigation/payload/sensor data in making decisions and maintaining safety. However, the edge nodes 410 may provide the required capacity and other capabilities to support sensor data driven avionics applications. In addition to high data throughput rates, the capability of the edge nodes 410 to provide ultra-reliable low latency connections (URLLC) and edge cloud computing may enable the partitioning of functionality of the aircraft 131/vehicle 405.

In one aspect of the disclosure, UAM vehicles, such as the aircraft 131/vehicle 405, may offload certain functions to the edge nodes 410 or the cloud node 205. For instance, the aircraft 131/vehicle 405 may include (or only include) the actuation systems 360 (discussed above with respect to FIG. 3A-3B) and sensors/payload. The aircraft 131/vehicle 405 may host only the most-time sensitive functionality, such as sensor/payload data management logic and control logic. The edge nodes 410 may host relatively-slower but tightly coupled processing, such as vehicle management logic, traffic management logic, mission planning logic, navigation logic, etc. The cloud node 205 may host applications that may tolerate larger delays, such as mission payload logic, analytics logic, etc. Moreover, the edge nodes 410 may also host traffic management logic, such as currently performed by air traffic control (ATC) for multiple aircraft 131/vehicles 405.

In the case the vehicle 405 includes less physical infrastructure/software infrastructure than the aircraft 131, the vehicle 405 may include (or only include) a GNSS receiver system 405A, a processor executing a distributed processing program to execute a distributed processing process (with a memory storing flight data 405B, payload data, and the distributed processing program), a sensor payload 405C, and a communication system 405D. The processor may be a part of, or the processor may be separate from, the GNSS receiver system 405A and/or the communication system 405D.

The GNSS receiver system 405A may perform the same functions as the GPS systems 354, discussed above. For instance, the GNSS receiver system 405A may receive signals from one or more GNSS satellites; and determine a position of the vehicle 405. Moreover, the GNSS receiver system 405A or the processor of the vehicle 405 may determine a GNSS signal strength based on the received GNSS signals.

The processor of the vehicle 405, in accordance with the sensor/payload data management logic, may store the flight data 405B in the memory. The flight data 405B may be stored in the memory for a flight data buffer period. The flight data buffer period may be: a set period of time, such as a day, an hour or multiple hours, a minute or minutes, or seconds; an entire flight or segments thereof such as between waypoints; more than one flight, etc. The flight data 405B may include the received GNSS signals and/or the determined position. The flight data 405B may also include other flight relevant data derived from the GNSS signals (e.g., signal strength, speed, velocity, acceleration, altitude, etc.) and/or the navigation information (or components thereof) from the on-board vehicle navigation systems 314, if the vehicle 405 has corresponding components.

The sensor payload 405C may be any one or more of the vehicle systems discussed above with respect FIGS. 3A-3B, such as the camera(s) 316, the edge sensors 312, the one or more transponder(s) 308, the on-board vehicle navigation systems 314, or sub-components thereof, etc. The sensor payload 405C may obtain payload data from the one or more of the vehicle systems. The processor of the vehicle 405, in accordance with the sensor/payload data management logic, may store the payload data on-board the vehicle 405 in the memory. The payload data may be stored in the memory for a payload buffer period. The payload buffer period may be the same or different from the flight data buffer period discussed above.

The processor of the vehicle 405, in accordance with the sensor/payload data management logic, may store the flight data 405B and the payload data on-board the vehicle 405 for the flight data buffer period and the payload buffer period, respectively, and then control the communication system 405D to transmit the stored flight data 405B/stored payload data to the edge nodes 410 and/or the cloud node 205 (depending, e.g., on type of data). For instance, the transmissions of the stored flight data 405B/stored payload data may be data messages to the edge nodes 410.

The communication system 405D may perform the same functions as the communications systems 306, discussed above. The communications system 405D may communicate wirelessly with one or more edge nodes 410 using general wireless standards, such Wi-Fi or, preferably, 5G.

Generally, the vehicle 405 may, in accordance with the control logic, may control the actuation systems 360 in accordance with control instructions from the edge nodes 410. The control instructions may be transmitted from the edge nodes 410 as control messages. For instance, the control instructions may indicate a speed, altitude, bearing, etc., or the control instructions may indicate a next GPS position. For instance, the control logic may determine whether a current speed/bearing/altitude of the vehicle 405 matches (or is within a threshold) a control speed/bearing/altitude of the control message; in response to the current speed/bearing/altitude of the vehicle 405 matching (or is within the threshold) the control speed/bearing/altitude of the control message, maintain a vehicle state; and in response to the current speed/bearing/altitude of the vehicle 405 not matching (or not within the threshold) the control speed/bearing/altitude of the control message, change the vehicle state to match (or be within the threshold). Likewise, the control logic may determine whether a current GPS position of the vehicle 405 matches (or is within a threshold) a control GPS position of the control message; in response to the current GPS position of the vehicle 405 matching (or is within the threshold) the control GPS position of the control message, maintain a vehicle state; and in response to the current GPS position of the vehicle 405 not matching (or not within the threshold) the control GPS position of the control message, change the vehicle state to match (or be within the threshold).

The control instructions may be generated dynamically by a controlling entity, and sent to the vehicle 405. The controlling entity may be a currently connected edge node 410 or an edge node 410/backbone node that has control over the vehicle 405; therefore, generally, it should be understood that when this disclosure references instructions from an edge node it should be understood that the controlling entity generates and sends the control instructions and one or more edge nodes 410 relayed the control instructions to the vehicle 405.

The edge nodes 410 may be the one or more communications station(s) 210 and/or the one or more ground station(s) 215 (or communications stations 210 combined with ground stations 215). Each of the edge nodes 410 may include an edge cloud 410A and a node 4106. Generally, the edge nodes 410 may be connected to each other directly and/or indirectly via the backbone network nodes. The backbone network nodes may be nodes at a higher communication layer than the edge nodes 410 that interface with end user devices (such as the vehicle 405). In one aspect of the disclosure, the backbone nodes may operate as the cloud edge 410A for the edge node 410, and the edge nodes 410 may not have a cloud edge 410A. For instance, the backbone nodes may execute a "Cloud RAN" for edge nodes 410 that only have radio/antenna, while the backbone nodes may host the avionics functions and baseband signal processing.

The node 410B may control communication with the vehicle 405, such as: (1) receiving messages from the vehicle 405 and relaying the messages to the cloud node 205; (2) receiving messages from the vehicle 405 and relaying the messages to the edge cloud 410A; (3) receiving messages from the cloud node 205 and relaying the messages to the vehicle 405; and (4) receiving messages from the edge cloud 410A and relaying the messages to the vehicle 405. The node 4106 may also control communication with other edge nodes 410 and/or the cloud node 205, such as (1) receiving messages from another edge node 410 and relaying the messages to the edge cloud 410A; (2) receiving messages from the edge cloud 410A and relaying the messages to the to another edge node 410; (3) receiving messages from the cloud node 205 and relaying the messages to the edge cloud 410A; and (4) receiving messages from the edge cloud 410A and relaying the messages to the cloud node 205.

The edge cloud 410A may execute edge cloud functions 415 for the aircraft 131/vehicle 405. For instance, the edge cloud functions 415 may include management functions 415A, situational awareness functions 4156, weather data functions 415C, and/or ATC transmissions functions 415D.

The situational awareness functions 4156 may execute situational awareness logic. The situational awareness functions 415B may combine relevant contextual information (e.g., aircraft 131/vehicle 405 health (based on data gathered by the vehicle status/health program 352, but the vehicle 405 may not host any analytics of the vehicle status/health program 352), power levels, schedules for flights/routes, traffic levels, etc.), and provide the contextual information to the management functions 415A.

The weather data functions 415C may execute weather data logic. The weather data functions 415C may determine weather information (e.g., local/regional weather conditions/future weather conditions), and provide the weather information to the management functions 415A (instead of the vehicle 405 hosting the weather program 322 of FIGS. 3A-3B).

The ATC transmissions functions 415D may execute the traffic management logic. The ATC transmissions functions 415D may determine ATC information (e.g., positions of/spacing between known aircraft 131/vehicles and intruder aircraft, e.g., based on ADS-B transmissions/scanning from the one or more ground station(s) 215), and provide the ATC information to the management functions 415A (instead of the vehicle 405 hosting (all or part) of the Detect/Sense and Avoid (D/S & A) program 334 of FIGS. 3A-3B).

The management functions 415A may receive the ATC information from the ATC transmissions functions 415D, the weather information from the weather data functions 415C, and/or the contextual information from the situational awareness functions 415B. The management functions 415A may also receive position information as reported in position messages from the vehicle 405 (e.g., based on the GNSS receiver system 405A). In response to receiving the various above-described information (or periodically), the management functions 415 may execute the management logic, the mission planning logic, and the navigation logic. The mission planning logic may execute the flight routing program 344 of FIGS. 3A-3B described above to generate/manage the flight plan data, so that the vehicle 405 does not have to host that logic. The navigation logic may execute the flight control program 370 and the vertiport status program 372 of FIGS. 3A-3B described above to determine the control instructions for the vehicle 405, so that the vehicle 405 does not have to host that logic. The management logic may receive the control instructions generated by the navigation logic for each vehicle 405 that the edge node 410 has control over; cross-check the control instructions for each vehicle 405 that the edge node 410 has control over, so that conflicts do not arise; generate the control messages to be broadcast to the vehicles 405; and transmit the control messages, individually or as a broadcast message. The management logic may also cross-check the control instructions against operational ceilings, and a terrain/obstacle database to ensure vehicles 405 are operating in safe/object free trajectories. For instance, the edge node 410 may perform real-time computation and transmission of the control messages (e.g., for optimal paths for each aircraft 131/vehicle 405). For instance, the optimal paths may consider the situational context of different destinations for different vehicles 405. In one aspect of the disclosure, the edge nodes 410 may be waypoints on a defined UAM air pathway, such as the routes 141, in this manner the edge nodes 410 may be positioned along a flight route of the aircraft 131/vehicle 405.

As an example, the vehicle 405 may transmit, in real-time, critical flight and navigation parameters (e.g., GPS position and environment data, such as weather or obstacle detection by the camera(s) 316) to the edge nodes 410. The edge nodes 410 may perform the above discussed logic and transmit decisions/directions back to the vehicle 405. The vehicle 405 may then execute the decisions/directions.

In one aspect of the disclosure, the edge node 410 that is the controlling entity may be: a nearest edge node 410 (e.g., based on GPS position); an edge node 410 that has a smallest round trip latency; an edge node 410 that has more processing power available (but still near enough to the vehicle 405 to be attached). For instance, this may enable minimum round-trip latency and/or processing time (or total time) for the data to be transmitted, processed, and received back as intelligent navigation and safety information.

In another aspect of the disclosure, the controlling entity may be one or more edge nodes 410, or the one or more edge nodes 410 may host the relevant information (state information for a particular vehicle 405) and pass responsibility as the controlling entity off-between the edge nodes 410 as the vehicle 405 moves. The state information may be the received payload data, flight data 405B, associated health/power, etc. information for the particular vehicle 405. For instance, the state information may be shared among neighboring edge nodes 410 (e.g., in an expected direction of the vehicle 405 (based on flight plan, speed, and time) or within a threshold distance around a current controlling entity) and be communicated to aircraft 131/vehicle 405.

As an example, the controlling entity may know the route 131 that vehicle 405 is using, other neighboring edge nodes 410, and a state of the transiting vehicle 405. In the connectivity handover, an on-board modem of the communication system 405D may assess a link quality (e.g., based on received signal strength indicator (RSSI)) with multiple nearby edge nodes 410; and attach to the edge node 410 with a best signal-to-noise ratio (SNR). For the handover of the computation tasks, the controlling entity and neighboring edge nodes 410 may be informed (by vehicle 405) or estimate an impending transition between edge nodes 410; and facilitate exchange of the state information.

A nominal case may be when the on-board modem of the communication system 405D is connected to a radio access network (RAN) base-station with a best SNR, which is likely on the nearest edge node 410. The nearest edge node 410 may be determined to be the controlling entity and host the avionics function for the vehicle 405.

In another aspect of the disclosure, the vehicle 405 may access and refer to a list of nearby edge nodes 410; and select an appropriate edge node 410 that can host the avionics function for the vehicle 405. In this case, the vehicle 405 may transmit a request to the selected edge node 410.

The cloud node 205 may perform the functions of the cloud service 205 discussed above. For instance, the cloud node 205 may execute cloud functions 420. The cloud functions 420 may include payload data functions 420A, data analytics functions 420B, and/or customer API functions 420C.

The payload data functions 420A may store payload data received from the vehicle 405 via the edge nodes 410 that is not sent to/hosted on the edge nodes 410. For instance, the payload data not sent to/hosted on the edge nodes 410 may be not mission/safety critical, such as long-term position tracking or maintenance data, or data that is no longer relevant to edge nodes 410 for current operations of a vehicle 405 (e.g., edge sensors 312 of a vehicle 405 from last week, etc.). The data analytics functions 420B may analyze the payload data not sent to/hosted on the edge nodes 410 to generate traffic reports, maintenance, efficiency reports, etc. The customer API functions 420C may manage communications to and from a relevant user of the vehicle 405, such as receiving a message to ground the vehicle 405 so that the relevant user can perform maintenance, or provide access to the data analytics functions 420B.

Turning to the distributed processing program, the vehicle 405, while executing the distributed processing program, may determine whether one of a first set of trigger conditions, one of a second set of trigger conditions, or one of a third set of trigger conditions are satisfied; in response to determining a first trigger condition of the first set of trigger conditions is satisfied, perform a first process corresponding to the first trigger condition on-board the vehicle 405; in response to determining a second trigger condition of the second set of trigger conditions is satisfied, prompting a second process corresponding to the second trigger condition by transmitting an edge request to an edge node 410 and receiving an edge response from the edge node 410; and in response to determining a third trigger condition of the third set of trigger conditions is satisfied, prompting a third process corresponding to the third trigger condition by transmitting a cloud request to the cloud service 205 (referred to hereafter as "cloud node 205") and receiving a cloud response from the cloud node 205.

The first set of trigger conditions may include receiving control instructions from an edge node 410 (to initiate a control action in accordance with the control logic); receiving data from the GNSS receiver system 405A (to be processed, stored, and transmitted to the edge node 410, in accordance with the sensor/payload data management logic); and receiving data from the sensor payload 405C (to be processed, stored, and transmitted to the edge node 410, in accordance with the sensor/payload data management logic). The second set of trigger conditions may include (1) an end of the flight data buffer period and the payload buffer period, for data types that are to be reported to the edge nodes 410; (2) an impending transition trigger condition for a transition between edge nodes 410. The third set of trigger conditions may include an end of the flight data buffer period and the payload buffer period, for data types that are to be reported to the cloud node 205. For instance, position, speed, heading, altitude, etc. of the vehicle 405 may be data types to be reported to the edge nodes 410, while data from edge sensors 312 of the aircraft 131/vehicle 405 may be data types to be reported to the cloud node 205. In response to determining a third trigger condition of the third set of trigger conditions (for various payload data), the vehicle 405 may transmit a payload data off-load message to transmit corresponding data to the cloud node 205. The impending transition trigger condition may be based on a comparison of SNR of multiple edge nodes 410, and as a SNR of a second edge node 410, as compared to a currently attached edge node 410, is better than, the same as, and/or is within a threshold distance of the SNR of the currently attached edge node 410, the trigger condition may be satisfied, and the vehicle 405 may transmit an impending transition message to the edge node 410. Generally, the various payload data types to be reported to the cloud node 205 may have different types of payload buffer periods or the same payload buffer periods. For instance, the payload buffer periods for the various payload data types to be reported to the cloud node 205 may short (e.g., 5, 10, 15 seconds) so that the various payload data types to be reported to the cloud node 205 do not use much buffer space in the memory.

The second set of trigger conditions may further include one or more of: (1) a regular heartbeat (e.g., timer) trigger condition, which triggers a transmission of sensor data to the edge node 410; (2) Weather Radar, DAPA, Vision trigger conditions: when one of the weather radar, DAPA, or vision systems detect external conditions that may require decisions for control actions, which triggers a transmission of corresponding data from the weather radar, DAPA, or vision systems; (3) detection trigger condition: when a sensor input condition cross static or dynamic thresholds, which triggers a transmission to issue an alert to other dependent systems; (4) augmentation trigger condition: when the vehicle 405 has data that should be augmented by some context specific or location specific remote database information (e.g. weather or air-traffic information specific to a location or time), which triggers a transmission that includes the data to the edge node 410; (5) stale data trigger condition: when data cached at the edge node 410 being utilized currently for the vehicle 405 becomes stale (e.g., has not been updated in a cache time period), triggers a transmission of an update cached data message; and/or (6) a query trigger condition: when a query initiated by the controlling entity (received through the edge node 410) requests fresh sensor information, triggers data gathering and transmission of the fresh sensor information to the edge node 410 to the controlling entity.

Furthermore, each of the first set of trigger conditions, the second set of trigger conditions, and the third set of trigger conditions, may include a dynamic priority for the trigger conditions that initiate processing on-board, edge, and cloud, respectively. For example, a distributed service for emergency management can be informational in a normal flight, but can assume highest priority when there is exigency.

Moreover, the vehicle 405 may perform a differential process to override a trigger condition of the second set of trigger conditions and/or the third set of trigger conditions to transmit the message to another one of the second set of trigger conditions and/or the third set of trigger conditions (or a different edge node 410 than a current edge node 410 for the second set of trigger conditions). For instance, the vehicle 405 may track previous transmissions and receipts of instructions to obtain historical data; obtain current system information (speed/bandwidth/etc. of edge nodes 410 nearby/cloud node 205); and select one of the nearby edge nodes 410 or the cloud node 205 (based on the historical data and current system information (cross-referenced based on type of service to be rendered by the edge node 410/cloud node 205) to perform a service. The vehicle 405 may select the one of the nearby edge nodes 410 or the cloud node 205 so that the service may be processed faster and/or more efficient than if processed by another of the nearby nodes 410 or the cloud node 205. For instance, the cloud node 205 may have substantially more processing power than the edge node 410, so significant processing tasks may be preferentially performed on the cloud node 205.

Therefore, generally, the distribution processing of the present disclosure may enable partitioning and hosting avionics applications on low latency wireless networks (e.g., such as 5G networks) by offloading computation, storage and other data functions to processing entities on a wireless mobile network edge (such as the edge nodes 410). This method of partitioning and hosting avionics applications may have an advantage of reducing resource requirements (energy, payload) on weight constrained aircraft, such as aircraft 131 or vehicle 405, used for urban air mobility.

Figure 5:
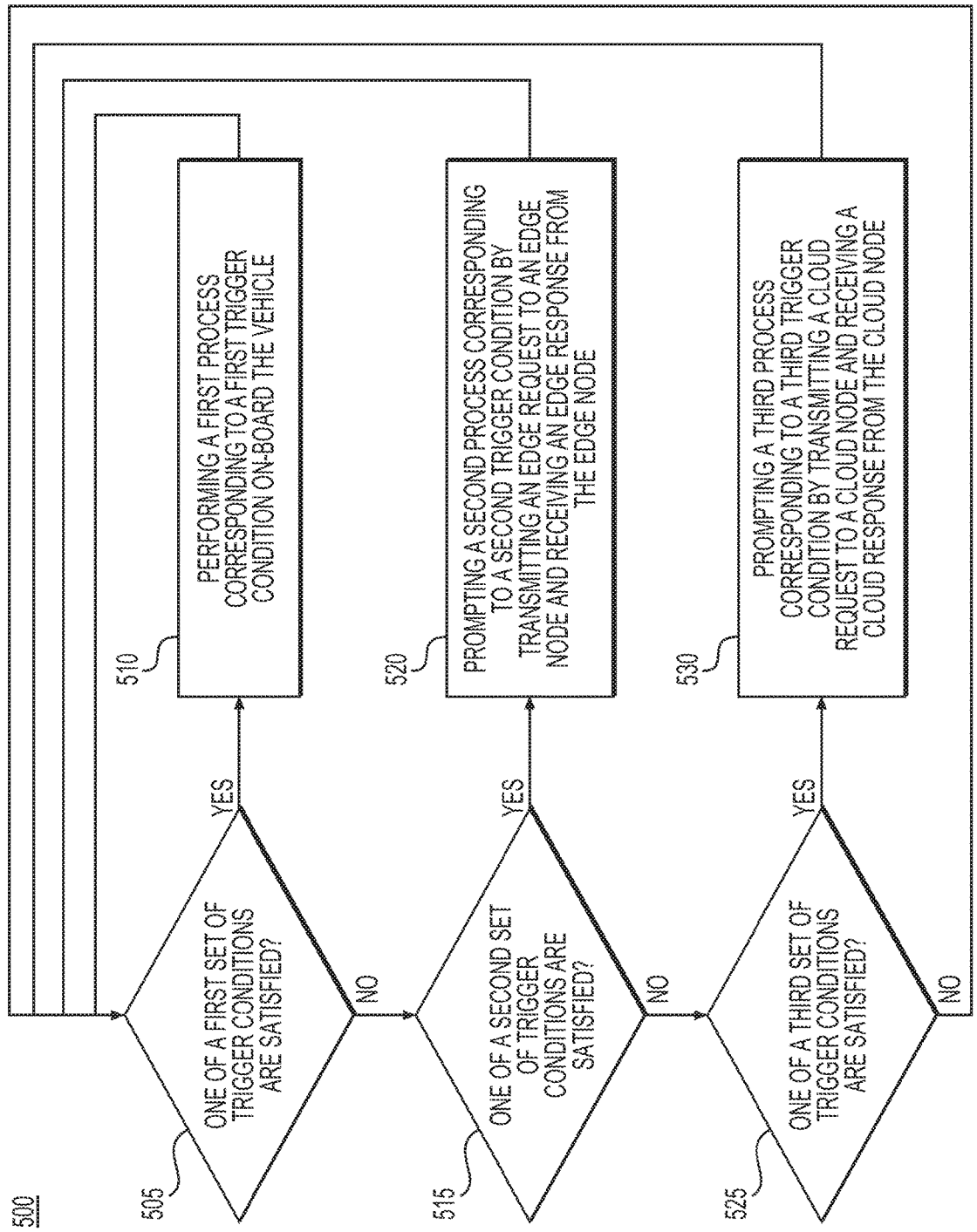
FIG. 5 depicts an exemplary flowchart for distributed avionics processing, according to one or more embodiments

FIG. 5 may depict an exemplary flowchart for distributed avionics processing, according to one or more embodiments. The flowchart 500 may depict the distributed processing process, as described above with respect to FIG. 4 above. The flowchart 500 may be performed by the aircraft 131/vehicle 405.

The aircraft 131/vehicle 405 may start the process of flowchart 500 to determine whether one (or more) of a first set of trigger conditions is satisfied (block 505). For instance, the aircraft 131/vehicle 405 may receive a control message from an edge node 410, as discussed above. In response to determining that one (or more) (e.g., a first trigger condition) of the first set of trigger conditions is satisfied (block 505: Yes), the aircraft 131/vehicle 405 may perform a first process corresponding to the first trigger condition on-board the aircraft 131/vehicle 405 (block 510). The aircraft 131/vehicle 405 may then proceed to determine whether one (or more) of a first set of trigger conditions is satisfied (block 505).

In response to determining that none of the first set of trigger conditions are satisfied (block 505: No), the aircraft 131/vehicle 405 may proceed to determine whether one (or more) of a second set of trigger conditions are satisfied (block 515). For instance, the aircraft 131/vehicle 405 may determine whether position information is to be transmitted to an edge node 410 as a flight data buffer period has ended or an impending transition trigger condition has been satisfied, as discussed above. In response to determining that one (or more) (e.g., a second trigger condition) of the second set of trigger conditions is satisfied (block 515: Yes), the aircraft 131/vehicle 405 may prompt a second process corresponding to the second trigger condition by transmitting an edge request to the edge node 410 and receiving an edge response from the edge node 410 (block 520). For instance, the aircraft 131/vehicle 405 may transmit the position information to the edge node 410 or the impending transition message, as discussed above. The edge response may be a confirmation of receipt, so that the aircraft 131/vehicle 405 may delete the data from its memory, or a control message (thus invoking, e.g., a first trigger condition). The aircraft 131/vehicle 405 may then proceed to determine whether one (or more) of a first set of trigger conditions is satisfied (block 505).

In response to determining that none of the second set of trigger conditions are satisfied (block 515: No), the aircraft 131/vehicle 405 may proceed to determine whether one (or more) of a third set of trigger conditions are satisfied (block 525). For instance, the aircraft 131/vehicle 405 may determine the end of the flight data buffer period and the payload buffer period, for data types that are to be reported to the cloud node 205, as discussed above. In response to determining that one (or more) (e.g., a third trigger condition) of the third set of trigger conditions is satisfied (block 525: Yes), the aircraft 131/vehicle 405 may prompt a third process corresponding to the third trigger condition by transmitting a cloud request to the cloud node 205 and receiving a cloud response from the cloud node 205 (block 530). For instance, the aircraft 131/vehicle 405 may transmit a payload data off-load message, as discussed above. The cloud response may be a confirmation of receipt, so that the aircraft 131/vehicle 405 may delete the data from its memory. The aircraft 131/vehicle 405 may then proceed to determine whether one (or more) of a first set of trigger conditions is satisfied (block 505).

In response to determining that none of the third set of trigger conditions are satisfied (block 515: No), the aircraft 131/vehicle 405 may proceed to determine whether one (or more) of the first set of trigger conditions are satisfied (block 505).

One of skill in the art would recognize that this process, while depicted as being performed in a conditional-serial manner for each of first, second, and third sets of trigger conditions, could also be performed in a parallel manner without conditional linking between the first, second, and third sets of trigger conditions.

Figure 6:
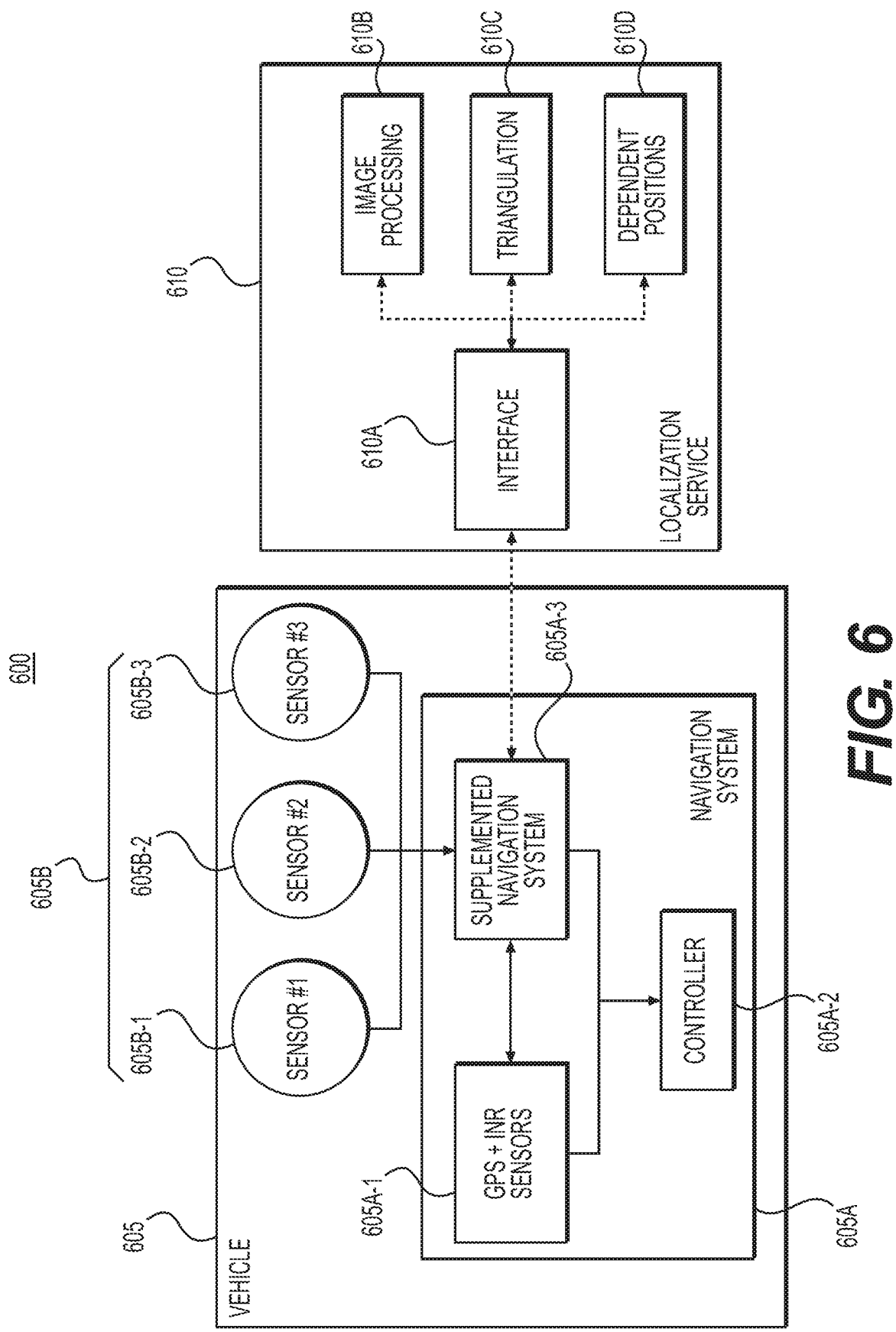
FIG. 6 depicts an exemplary a system for distributed avionics processing for supplemental navigation, according to one or more embodiments.

FIG. 6 may depict an exemplary system 600 for distributed avionics processing for supplemental navigation, according to one or more embodiments. The system 600 for distributed avionics processing for supplemental navigation may be the same as the system 200 depicted in FIG. 2 and the system 400 depicted in FIG. 4, except that the system 600 is illustrative of how the aircraft 131/vehicle 405/vehicle 605 and a localization service 610 distribute avionics/vehicle processing to provide supplemental navigation data to the aircraft 131/vehicle 405/vehicle 605. The aircraft 131/vehicle 405/vehicle 605 may work together to more precisely determine a position of an aircraft 131/vehicle 405/vehicle 605. In this manner, the vehicle 605 may better navigate urban environments that usually have de-graded GNSS signals. The vehicle 605 may include all of the features of the aircraft 131 discussed above (again, while off-boarding some/all data storage and/or some/all non-essential local processing functions as, e.g., processing power/memory savings and/or redundancy), or include the features of vehicle 405 with less physical infrastructure/ software infrastructure and rely on the off-boarding processes to provide the corresponding functionality.

In the case the vehicle 605 includes less physical infrastructure/software infrastructure, the vehicle 605 may include (or only include) a navigation system 605A and a sensor system 605B. The navigation system 605A may include an on-board position system 605A-1, a controller 605A-2, and/or a supplemented navigation system 605A-3. The sensor system 605B may include a first sensor 605B-1, a second sensor 605B-2, and/or a third sensor 605B-3. A processor executing a supplemental navigation processing program (stored in a memory) may be included in the navigation system 605A (e.g., as the controller 605A-2), or in a separate component of the vehicle 605. The supplemental navigation processing program may cause the processor of the vehicle 605 to execute a client-side of a supplemental navigation process, meanwhile the edge node 410 or the cloud node 205 may execute a node-side of the supplemental navigation process.

The on-board position system 605A-1 may include the GNSS receiver system 405A and/or an IRS to determine a position based on GNSS signals integrated/corrected by inertial navigation methods. The controller 605A-2 may output a final position for the control logic to control the vehicle 605 in accordance with control instructions (as discussed below with regards to the navigation control process). The final position may be determined: based solely on the on-board position system 605A-1 (e.g., if the GNSS signal is above a threshold); based on the on-board position system 605A-1 and an output from the supplemented navigation system 605A-3; based solely on the output from the supplemented navigation system 605A-3. The supplemented navigation system 605A-3 may determine when and where a navigation supplementation request message is to be transmitted (or always send it, e.g., every set period of time).

In general, the vehicle 605, while executing a client-side of the supplemental navigation process, may: obtain reference data from one or a combination of a first sensor, a second sensor, and a third sensor of the vehicle 605; transmit a navigation supplementation request message including the reference data to an edge node 410 or a cloud node 205; in response to receiving a resolved position message, perform a navigation control process based on the determined position.

The first sensor of the vehicle 605 may be an imaging system, such as camera(s) 316. The second sensor of the vehicle may be an antenna system, such as an ADS-B or communication system 405D. The third sensor may be a radar system, such as the one or more radars of the on-board vehicle navigation systems 314. Generally, the first sensor 605B-1, the second sensor 605B-2, and the third sensor 605B-3 may, each respectively, have multiple sensors for each of the sensor types so that the vehicle 605 may have built in redundancy.

To obtain the reference data from the one or a combination of a first sensor, a second sensor, and a third sensor of the vehicle 605, the vehicle 605, in accordance with the sensor/payload data management logic, may: control the imaging system, the antenna system, and/or the radar system of the vehicle 605 to gather reference data. The reference data may include: (1) one or more images from the camera(s) 316 (as discussed above with respect to FIGS. 3A-3B); (2) ADS-B information indicating positions of buildings, ground stations, and/or other vehicles based on received ADS-B messages; (3) beacon information based on beacon messages from smart buildings/edge nodes 410 indicating a range (based on, e.g., phase coded messaging formats) and a position/position ID associated with the position received using the communication system 405D; and/or (4) range information indicating range readings to objects being tracked by the one or more radars.

The supplemented navigation system 605A-3 of the vehicle 605 may, before transmitting the navigation supplementation request message and in response to obtaining the reference data, determine whether a GNSS signal is below a threshold; and in response to determining the GNSS signal is below the threshold (e.g., determine to send request), transmit the navigation supplementation request message. Alternatively, the supplemented navigation system 605A-3 of the vehicle 605 may, before transmitting the navigation supplementation request message and before obtaining the reference data, determine whether the GNSS signal is below the threshold; and in response to determining the GNSS signal is below the threshold (e.g., determine to send request if reference data is obtained), obtain the reference data; and in response to obtaining the reference data, transmit the navigation supplementation request message.

The supplemented navigation system 605A-3 may generate the navigation supplementation request message; and transmit the navigation supplementation request message to an edge node 410 or the cloud node 205. To generate the navigation supplementation request message, the supplemented navigation system 605A-3 may, in accordance with sensor/payload data management logic, filter reference data from a set period of time (e.g., the last 5 seconds or last minute, etc.); combine the filtered reference data with a vehicle identification (ID); and instruct a communication system of the vehicle 605, such as the communication system 405D, to transmit the combined filtered reference data with the vehicle ID.

The supplemented navigation system 605A-3 may also determine where to send the request. For instance, the supplemented navigation system 605A-3 may determine to transmit an edge request and/or cloud request to the edge node 410 or cloud node 205, depending on data type. For instance, edge nodes 410 may not host image processing for every known reference image, so that request may be sent to the cloud node 205. However, edge nodes 410 may host reference images for buildings/structures within a threshold distance of the edge node 410, so the vehicle 605 may transmit an edge request if a vehicle position of the vehicle 605 is within the threshold distance of a particular edge node 410. For instance, specific edge nodes 410 may be selected according to a service merit based selection scheme. The selected edge nodes 410 may host the full image processing, meanwhile the non-selected edge nodes 410 may not host image processing or may host only partial image processing.

For instance, edge nodes 410 may perform: (1) trilateration processing and dependent position processing; (2) full image processing, trilateration processing, dependent position processing; or (3) partial image processing, trilateration processing, dependent position processing. Full image processing may be for all known reference images for buildings/structures, while partial image processing may for known reference images for buildings/structures within a threshold distance of the edge node 410. The cloud node 205 may perform: (1) full image processing, trilateration processing, dependent position processing; or (2) partial image processing, trilateration processing, dependent position processing. In the case the cloud node 205 perform partial image processing, the cloud node 205 may only use a sub-set (e.g., within a threshold time/distance of last known time/ position of the vehicle 605) of all known reference images for buildings/structures in the analysis so as to reduce processing time/processing power. The vehicle 605 may have an index associating edge nodes 410 with what processing the edge nodes 410 may be able to perform. If the vehicle 605 is attached to an edge node 410, or close enough to request another edge node 410 (directly or indirectly through the edge node it is attached to), the vehicle 605 may determine what reference data types are in the filtered reference data; and select an edge node 410 (from the index) that can provide the most types of processing (based on the index), and/or select the cloud node 205 (e.g., if none of the edge nodes nearby have full or partial image processing and the reference data has image data).

To perform the navigation control process based on the determined position (or, resolved position in the resolved position message, if more than one process determines a position), the vehicle 605 may continue following a previous control message (or currently received control message, e.g., in the resolved position message, if the localization service is also a controlling entity, as discussed above with respect to FIGS. 4-5), in accordance with the control logic discussed above with respect to FIGS. 4-5, The localization service 610 may include interface functions 610A (e.g., an API interface/gateway that handles requests from the aircraft 131/vehicle 405/vehicle 605). The localization service 610 may also execute one or more functions to determine a position of a vehicle 605. The one or more functions may include an image processing function 610B, a trilateration function 610C, and a dependent position function 610D, which are described below with respect to FIGS. 7A-7C. The interface functions 610A may manage communications between the localization service 610 and the vehicle 605. For instance, the interface functions 610A may act as an API interface/gateway that handles requests from the aircraft 131/vehicle 405/vehicle 605, and transmits responses to the aircraft 131/vehicle 405/vehicle 605.

The edge node 410 or the cloud node 205 (as the localization service 610) may execute a node-side of the supplemental navigation process. The edge node 410 or the cloud node 205, while executing the node-side of the supplemental navigation processing program, may: in response to receiving a navigation supplementation request message from a vehicle 605, perform a position resolution process to determine a position of the vehicle 605 by one or more functions; and transmit a resolved position message including the determined position of the vehicle 605 to the vehicle 605.

To perform the position resolution process to determine the position of the vehicle 605 by the one or more functions, the edge node 210 or the cloud node 205 may extract reference data and vehicle ID from the received navigation supplementation request message; determine whether the reference data includes one or more of: (1) one or more images; (2) ADS-B information; (3) beacon information; and/or (4) range information.

The edge node 210 or the cloud node 205 may: in response to the reference data including ADS-B information (for entities that have known positions, such as ground stations 215) and/or the beacon information, invoke trilateration processing; in response to the reference data including the ADS-B information and/or the range information, invoke dependent position processing; and in response to the reference data including the one or more images, invoke image processing.

Figure 7A:
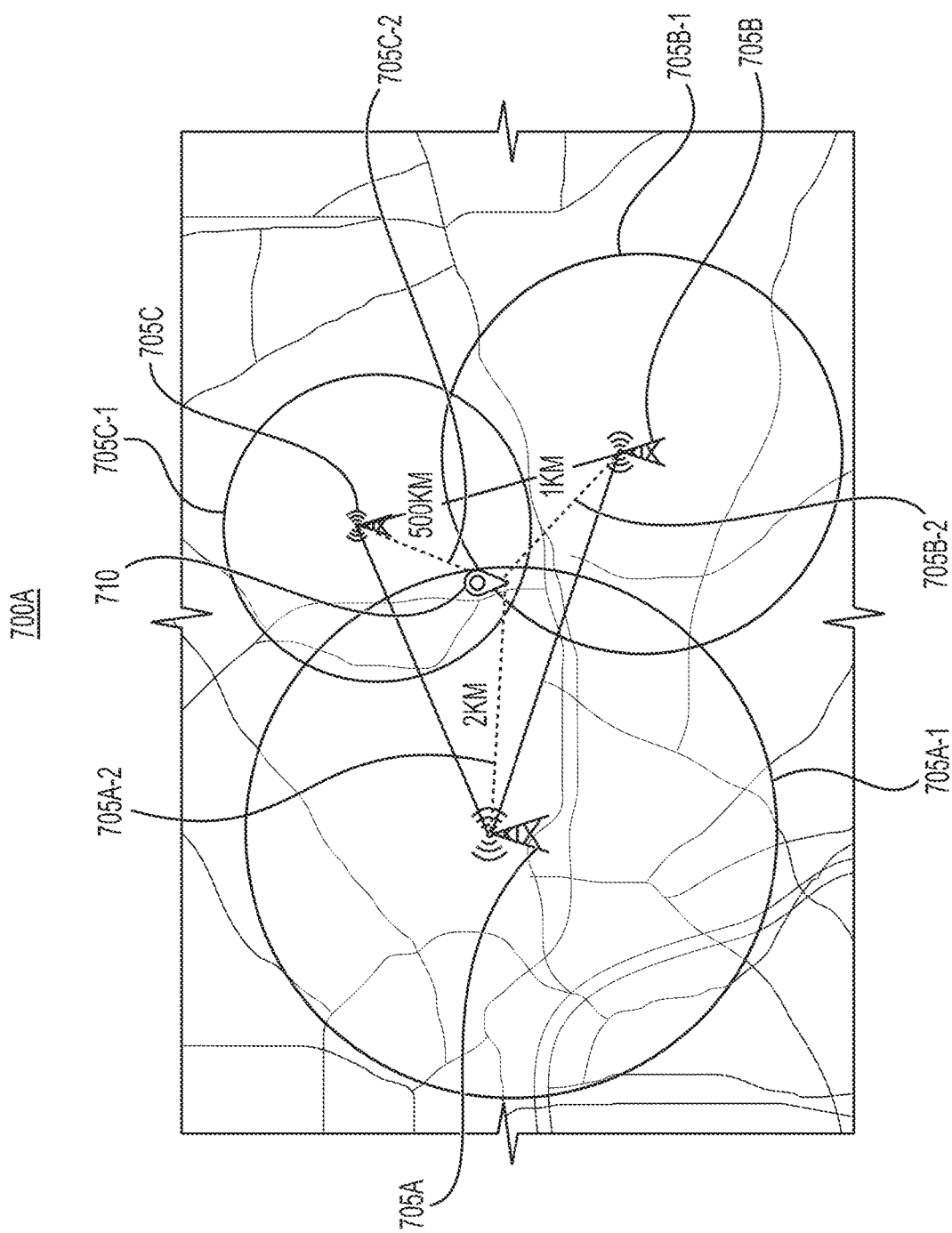
FIG. 7A-7C depict exemplary system environments for distributed avionics processing for supplemental navigation, according to one or more embodiments.
Figure 7B:
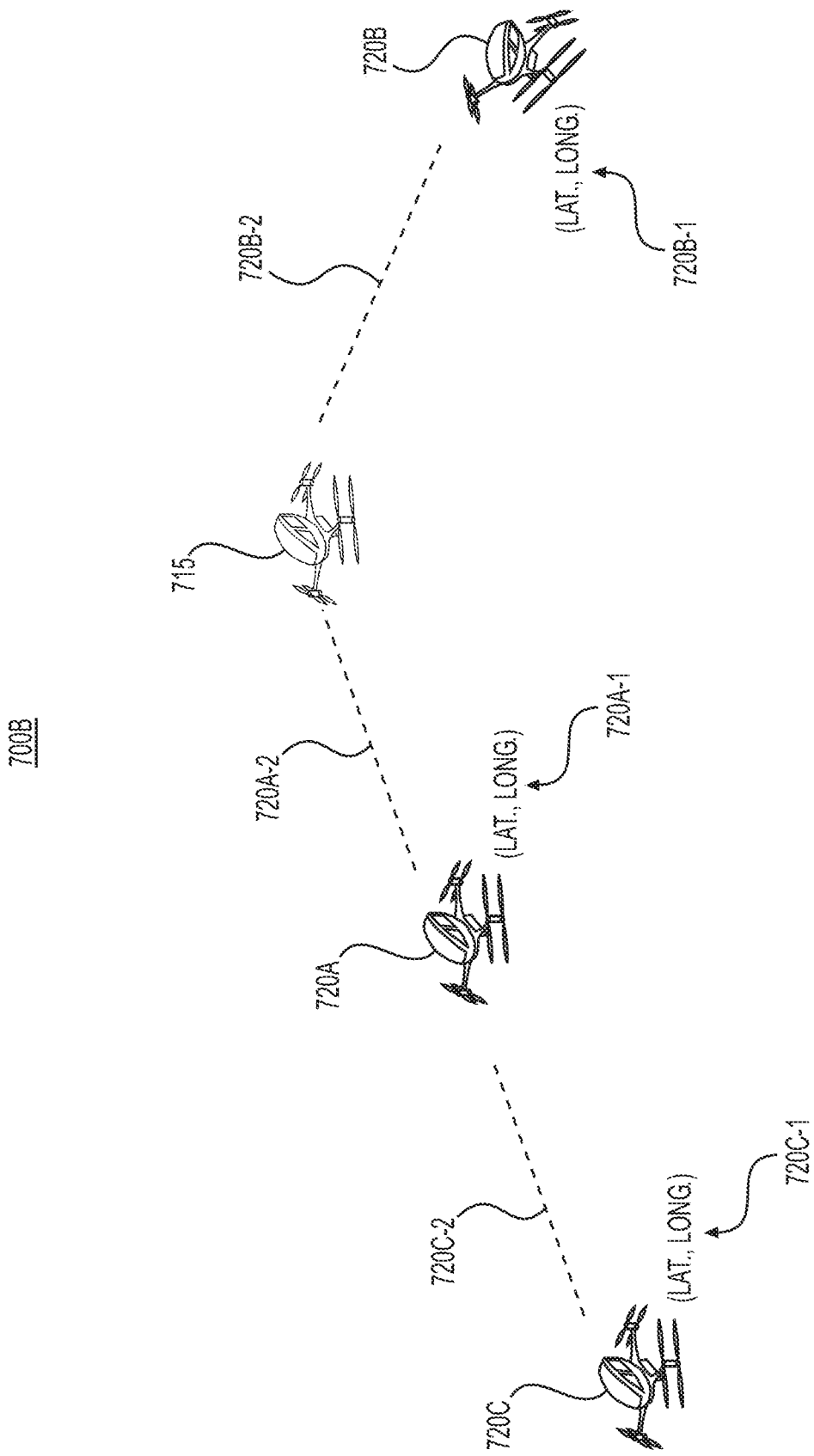
Figure 7C:
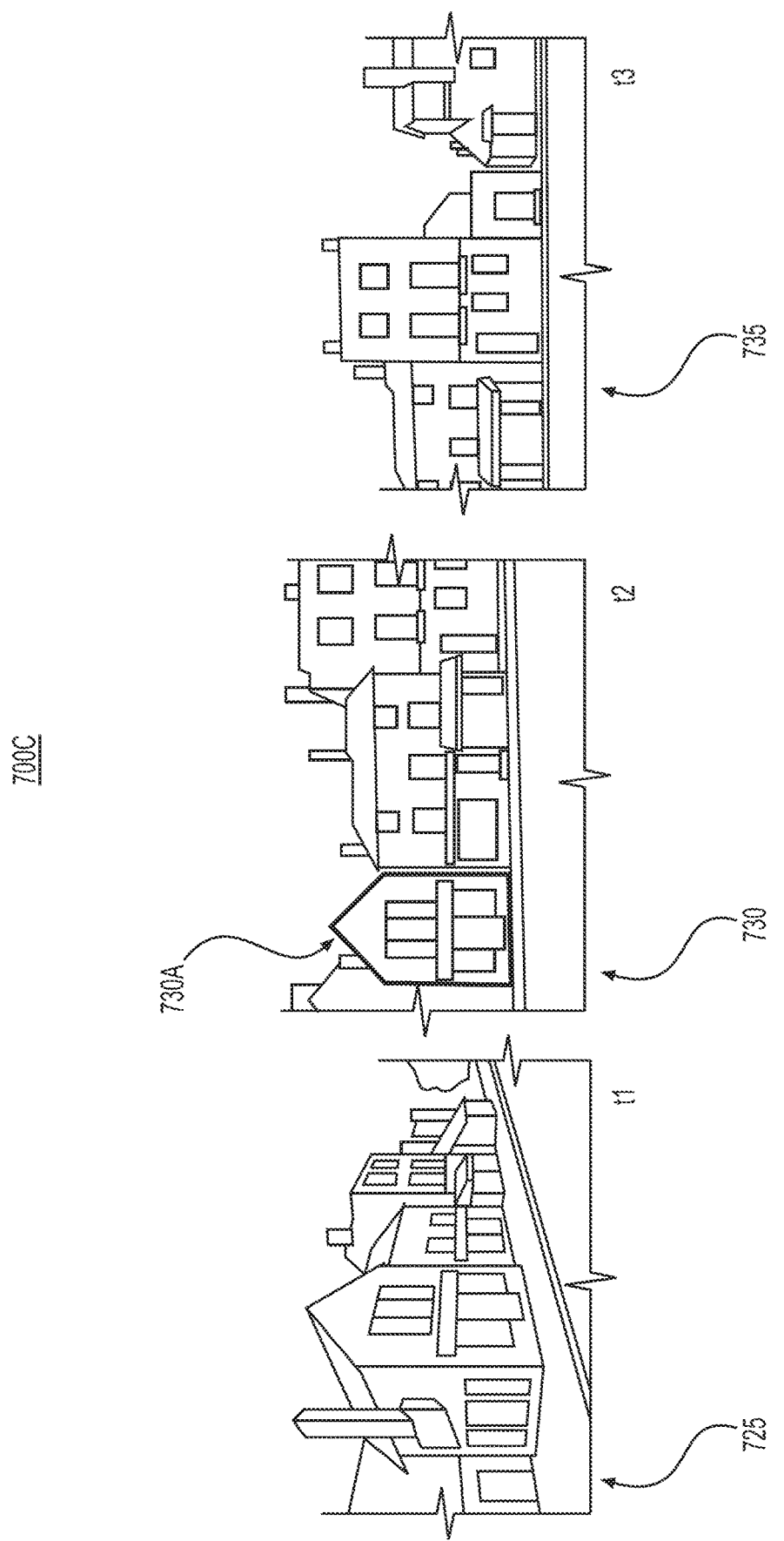

FIGS. 7A-7C may depict exemplary system environments for distributed avionics processing for supplemental navigation, according to one or more embodiments. Specifically, FIGS. 7A-7C depict illustrative system embodiments to explain the one or more functions used by the edge node 210 or the cloud node 205 to determine a position of the vehicle 605.

Turning to FIG. 7A, the trilateration function 610C (to execute the trilateration processing) may: obtain the ADS-B information (for entities that have known positions, such as ground stations 215) and/or the beacon information; obtain positions 705A, 705B, 705C from the ADS-B information (for entities that have known positions, such as ground stations 215) and/or the beacon information (or reference database) for the entities associated with the ADS-B information and/or the beacon information; determine ranges 705A-2, 705B-2, 705C-2 for the ADS-B information and/or the beacon information from the entities to the vehicle 605; and based on the positions 705A, 705B, 705C and the ranges 705A-2, 705B-2, 705C-2, triangulate the position of the vehicle 605 using trilateration, such as true range multilateration or pseudorange multilateration.

Alternatively or additionally, smart buildings and/or edge nodes 410 may estimate the range to aircraft 131/vehicle 605 and report to the localization service 610. Similarly, other aircraft 131/vehicles 605 may also report ranges to other aircraft 131/vehicles 605 flying near them. Using the reported ranges (and positions from the reporting entities that have known positions), the localization service 610 may triangulate positions of every object (aircraft 131/vehicles 605).

Moreover, the localization service 610 may execute error detection and exclusion algorithms to identify faulty measurements to avoid inaccuracies. For instance, if the ranges estimated by a device are wrong (e.g., if it is faulty all the ranges reported by that device would be wrong), the device may be excluded; known positions may be used as another technique to find errors when a determined position is different from a known position for a smart building/edge node 410; if a range estimated by one of the aircraft 131/vehicles 605 to a known building/edge node 410 is wrong, it may be monitor and it may be excluded after confirming. Furthermore, in the case one aircraft 141/vehicle 605 may not be able to determine its own position (e.g., due to malfunction), then other aircraft 131/vehicles 605 may determine the failed aircraft's position for emergency rescue.

Turning to FIG. 7B, the dependent position function 610D (to execute the dependent position processing) may: obtain the ADS-B information and/or the range information; obtain positions 720A-1, 720B-1, 720C-1 for entities 720A, 720B, 720C, respectively; obtain ranges between neighboring entities 720A-2, 720B-2, 720C-2 for each of the entities 720A, 720B, 720C; and determine a positions of vehicle 715 (in this case, vehicle 605 that transmitted the navigation supplementation request message) based on the positions 720A-1, 720B-1, 720C-1 for entities 720A, 720B, 720C, respectively and the ranges between neighboring entities 720A-2, 720B-2, 720C-2 for each of the entities 720A, 720B, 720C. For instance, UAM vehicles may be sequenced on a sky-lane (e.g., routes 131) and position estimation for vehicle 715 may be estimated by knowing the range and position of trailing or leading vehicles.

Turning to FIG. 7C, the image processing function 610B (to execute the imaging processing) may: obtain the one or more images 725, 730, and 735; and process the images for known reference 730A; if known reference 730A is found in an image (this case, image 730), obtain a known position of the known reference 730A may be obtained (e.g., by referring to a database and finding a corresponding position based on known reference ID); determine range and orientation from known reference 730A by performing image analysis on images before and after the image 730 in which the known reference 730A is detected; and estimate position of vehicle 605 based on the range and the orientation.

For instance, the image processing function 610B may use unique images of city structures and neural networks (e.g., deep learning) to match city structures. For instance, as UAM vehicles, such as aircraft 131/vehicle 605, may travel in predetermined paths (e.g., routes 131), the neural network may learn to label specific buildings along the routes 131; as/after the neural network is trained, the neural network may indicate an image of the one or more images contains a specific building along the route 131. The respective position of the specific building may be retrieved based on an output of the neural network.

In another aspect of the disclosure, the localization service 610 may vote/filter (if more than process is used to determine a position of the vehicle 605). For instance, to filter positions, from among the determined positions, the localization service 610 may group determined positions that are within a threshold distance of each; exclude outliers (e.g., determined positions that no other determined position concurs is within the threshold distance); and average remaining determined positions. Alternatively, to vote, the localization service 610 may average the determined positions with/ without filtering to exclude outliers. For instance, the localization service 610 may determine a median of the determined positions if there are three (or an odd number of) processes used to determine a position of the vehicle 605 (e.g., the corresponding sensors are able to obtain useful data); the localization service 610 may determine an average of the determined positions if there are two (or an even number of) processes used to determine a position of the vehicle 605 (e.g., the corresponding sensors are able to obtain useful data). The location service 610 may set the average/median position as a resolved position for the vehicle 605; generate the resolved position message (that includes the resolved position and the vehicle ID); and transmit the resolved position message to the vehicle 605. Moreover, the localization service 610 may also determine a health metric of the resolved position that indicates a confidence of the resolved position and/or of the sensors ability to obtain useful data. For instance, the localization service 610 may determine the health metric if a majority (e.g., three out of five, two out of three) sensors indicate a determined position within a threshold of each other.

Therefore, generally, the methods and systems of the present disclosure may enable the use of low cost onboard navigation sensors because they may be supplemented by known references and images. Moreover, precise position information may be obtained in de-graded GNSS signal regions by cross-referencing multiple data sources, thereby improving failure margin as multiple means of supplementing navigation are used. Furthermore, as the methods and systems of the present disclosure rely on the benefit of path planning in UAM (with the routes 131), specific beacons and known references may be used and/or learned over time.

Figure 8:
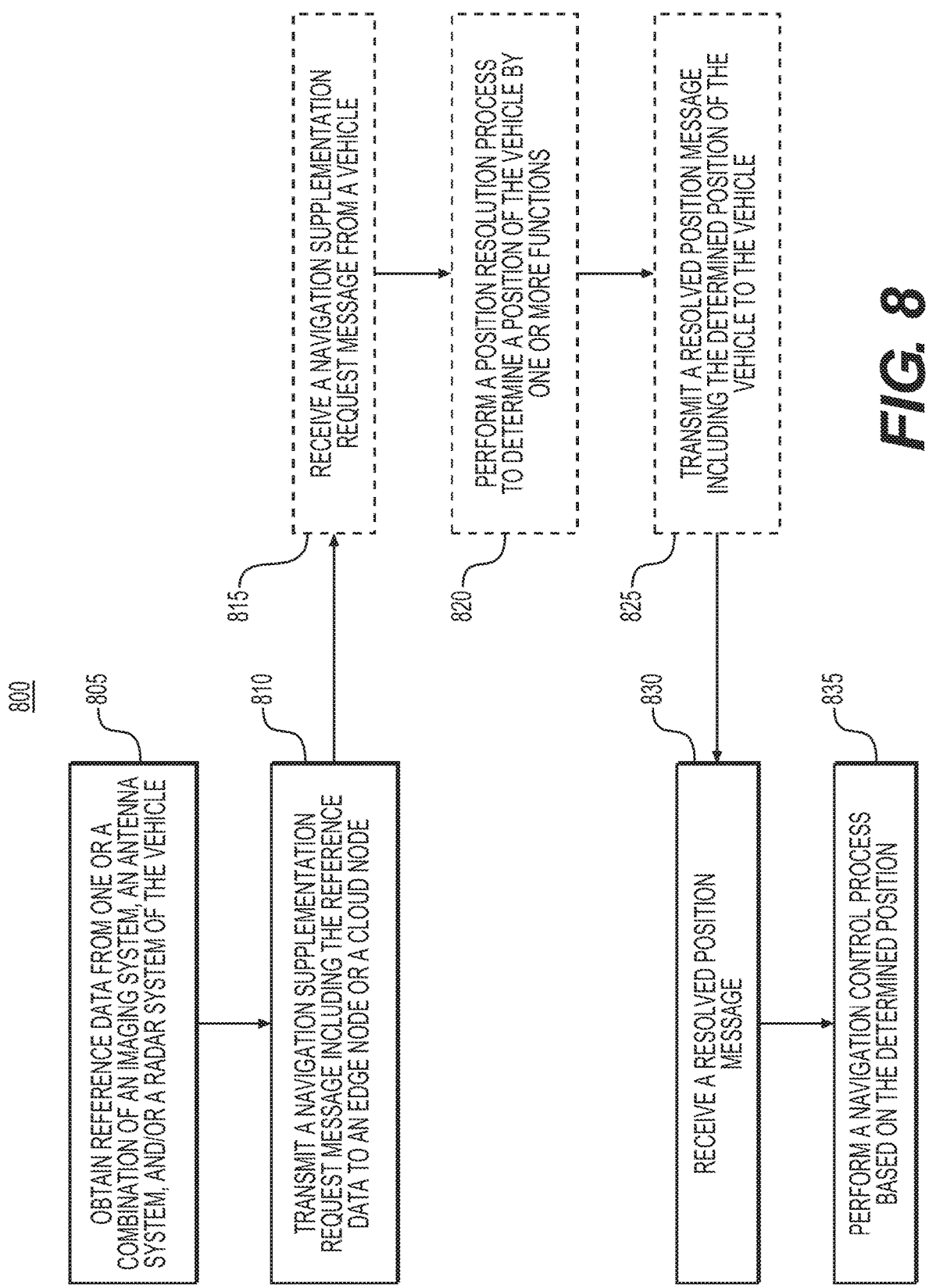
FIG. 8 depicts an exemplary flowchart for distributed avionics processing for supplemental navigation, according to one or more embodiments

FIG. 8 may depict an exemplary flowchart for distributed avionics processing for supplemental navigation, according to one or more embodiments. The flowchart 800 may depict the supplemental navigation process, as described above with respect to FIG. 6 above. The flowchart 800 may be performed by the aircraft 131/vehicle 405/vehicle 605 (e.g., blocks 805, 810, 830, and 835), and the edge node 410 or the cloud node 205 (e.g., blocks 815, 820, and 825). The aircraft 131/vehicle 405/vehicle 605 may start the process of flowchart 800 to obtain reference data from one or a combination of an imaging system, an antenna system, and/or a radar system of the vehicle (block 805).

The aircraft 131/vehicle 405/vehicle 605 may then proceed to transmit a navigation supplementation request message including the reference data to the edge node 410 or the cloud node 205 (block 810). The edge node 410 or cloud node 205 may then proceed to receive the navigation supplementation request message from the aircraft 131/vehicle 405/vehicle 605 (block 815).

The edge node 410 or cloud node 205 may then proceed to perform a position resolution process to determine a position of the aircraft 131/vehicle 405/vehicle 605 by one or more functions (block 820). For instance, the edge node 410 or cloud node 205 may execute the image processing, trilateration processing, and/or the dependent position processing, as discussed above. The edge node 410 or cloud node 205 may then proceed to transmit a resolved position message including the determined position of the aircraft 131/vehicle 405/vehicle 605 to the aircraft 131/vehicle 405/ vehicle 605 (block 825). The aircraft 131/vehicle 405/ vehicle 605 may then proceed to receive the resolved position message (block 830).

The aircraft 131/vehicle 405/vehicle 605 may then proceed to perform a navigation control process based on the determined position (block 835). For instance, the aircraft 131/vehicle 605 may control the vehicle 605 in accordance with the control logic and a control instruction, as discussed above.

Figure 9:
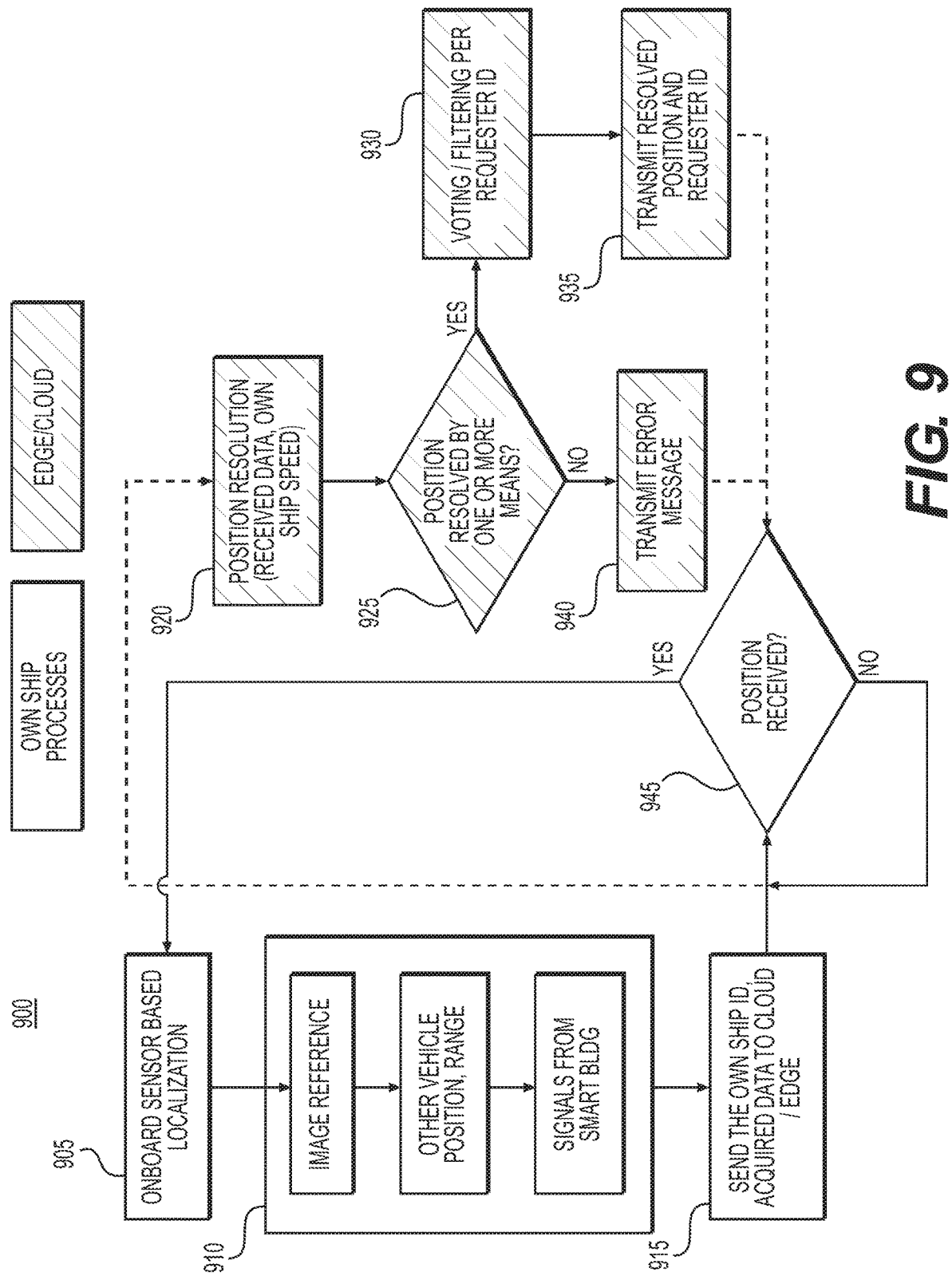
FIG. 9 depicts an exemplary flowchart for distributed avionics processing for supplemental navigation, according to one or more embodiments

FIG. 9 may depict an exemplary flowchart for distributed avionics processing for supplemental navigation, according to one or more embodiments. The flowchart 900 may depict a more detailed supplemental navigation process, as described above with respect to FIG. 6 above. The flowchart 900 may be performed by the aircraft 131/vehicle 405/ vehicle 605 (e.g., blocks 905, 910, 915, and 945), and the edge node 410 or the cloud node 205 (e.g., blocks 920, 925, 930, 935, and 940).

The aircraft 131/vehicle 405 may start the process of flowchart 900 to perform onboard sensor localization (block 905). For instance, the aircraft 131/vehicle 405/vehicle 605 may determine a position using the on-board position system 605A-1, as discussed above. The aircraft 131/vehicle 405/ vehicle 605 may then proceed to (e.g., if a GNSS signal is below a threshold) to acquire reference data (block 910). The aircraft 131/vehicle 405/vehicle 605 may then proceed to transmit ownship ID (e.g., the vehicle ID) and the acquired reference data to the edge node 410 or the cloud node 205 (block 915). The edge node 410 or cloud node 205 may then proceed to perform a position resolution process to determine a position of the aircraft 131/vehicle 405/vehicle 605 by one or more functions (block 920). The edge node 410 or cloud node 205 may then proceed to determine whether the position of the aircraft 131/vehicle 405/vehicle 605 is determined by one or more of the functions (block 925).

In response to determining the position of the aircraft 131/vehicle 405/vehicle 605 is determined by one or more functions (block 925: Yes), the edge node 410 or cloud node 205 may then proceed to perform a voting/filtering process per requester ID (block 930). The edge node 410 or cloud node 205 may then proceed to transmit a resolved position and requester ID to the aircraft 131/vehicle 405/vehicle 605 (block 935). In response to determining the position of the aircraft 131/vehicle 405/vehicle 605 has not been determined by one or more means (block 925: No), the edge node 410 or cloud node 205 may then proceed to transmit an error message to the aircraft 131/vehicle 405/vehicle 605 (block 940).

The aircraft 131/vehicle 405/vehicle 605 may then proceed to determine whether a resolved position has been received (block 945). For instance, the aircraft 131/vehicle 405/vehicle 605 may determine whether a position resolution message has been received, as discussed above.

In response to determining a resolved position has not been received (block 945: No), the aircraft 131/vehicle 405/vehicle 605 may then proceed to (1) send another request (block 945) and/or (2) wait for an error message or resolved position from the edge node 410 or the cloud node 205 (by allowing the process of blocks 920-940 to execute again). In response to determining a resolved position has been received (block 945: Yes), the aircraft 131/vehicle 405/vehicle 605 may then proceed to perform onboard sensor localization (block 905).

Figure 10:
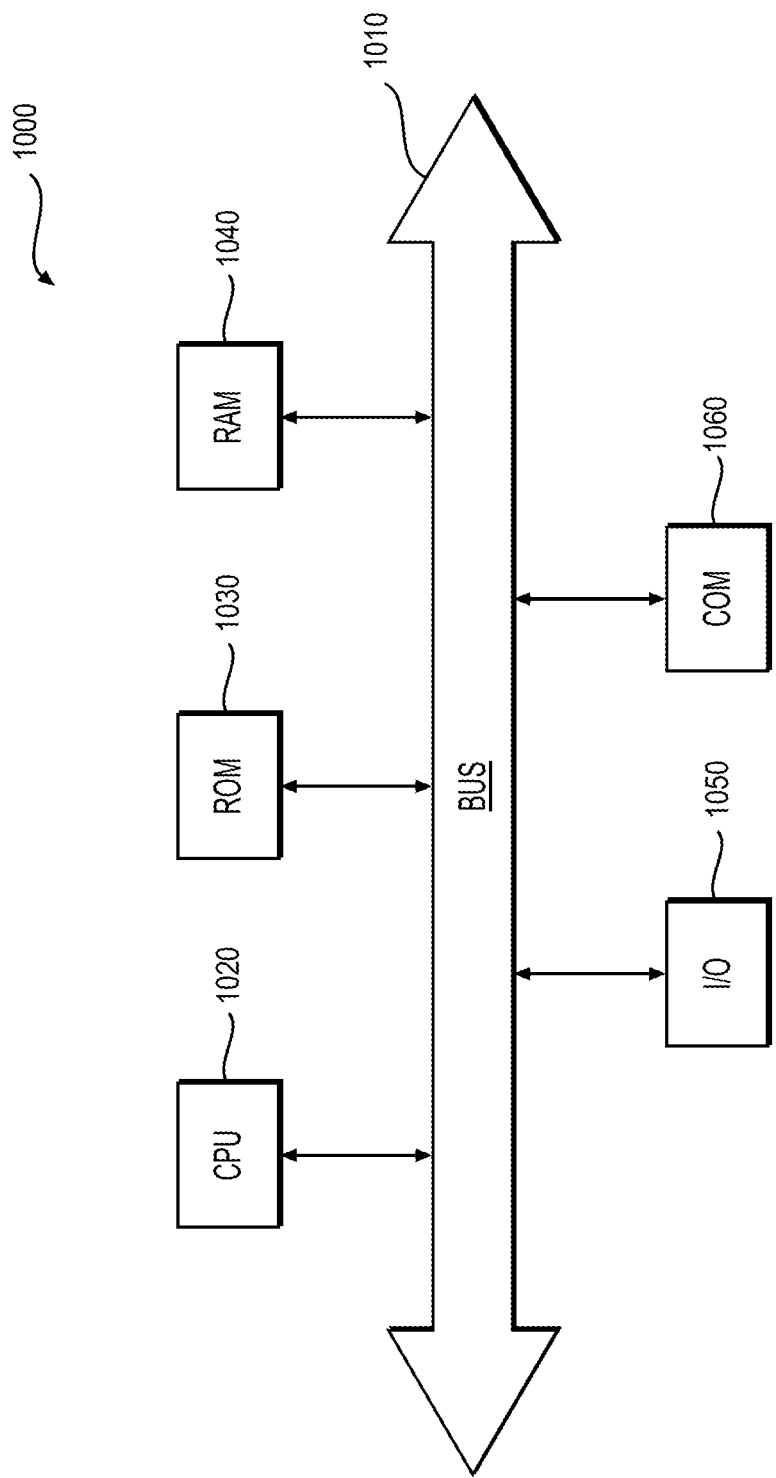
FIG. 10 depicts an example system that may execute techniques presented herein.

FIG. 10 depicts an example system that may execute techniques presented herein. FIG. 10 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1060 for packet data communication. The platform may also include a central processing unit ("CPU") 1020, in the form of one or more processors, for executing program instructions. The platform may include an internal communication bus 1010, and the platform may also include a program storage and/or a data storage for various data files to be processed and/or communicated by the platform such as ROM 1030 and RAM 1040, although the system 1000 may receive programming and data via network communications. The system 1000 also may include input and output ports 1050 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for distributed vehicle processing for a vehicle, comprising:
   determining whether one of a first set of trigger conditions, one of a second set of trigger conditions, or one of a third set of trigger conditions are satisfied;
   in response to determining a first trigger condition of the first set of trigger conditions is satisfied, performing a first process corresponding to the first trigger condition on-board the vehicle;
   in response to determining a second trigger condition of the second set of trigger conditions is satisfied, prompting a second process corresponding to the second trigger condition by transmitting an edge request to an edge node and receiving an edge response from the edge node; and
   in response to determining a third trigger condition of the third set of trigger conditions is satisfied, prompting a third process corresponding to the third trigger condition by transmitting a cloud request to a cloud node and receiving a cloud response from the cloud node.

2. The method of claim 1, wherein the first set of trigger conditions include:
   receiving control instructions from the edge node;
   receiving data from a GNSS receiver system; and
   receiving data from a sensor payload.

3. The method of claim 1, wherein the second set of trigger conditions include:
   an end of a flight data buffer period or a payload buffer period for data types that are to be reported to the edge node;
   an impending transition trigger condition for a transition between the edge node and a second edge node;
   a regular heartbeat trigger condition;
   one or more of weather radar trigger conditions, digital adaptive phased array radar trigger conditions, or vision trigger conditions;
   detection trigger conditions;
   augmentation trigger condition;
   stale data trigger conditions; and/or
   a query trigger condition.

4. The method of claim 1, wherein the third set of trigger conditions include an end of a flight data buffer period or a payload buffer period for data types that are to be reported to the cloud node.

5. The method of claim 1, wherein the vehicle includes actuation systems, one or more sensors, and/or payload systems, the vehicle is configured to host time sensitive functionality including sensor/payload data management logic and control logic,
   the edge node is one of a plurality of edge nodes, the edge node is configured to host vehicle management logic, traffic management logic, mission planning logic, and/or navigation logic for the vehicle, and
   the cloud node is configured to host mission payload logic and/or analytics logic.

6. The method of claim 5, wherein the edge node is a controlling entity of the vehicle that issues control instructions to the vehicle, and the edge node is:
   a nearest edge node of the plurality of edge nodes to the vehicle;
   an edge node of the plurality of edge nodes that has a smallest round trip latency; and/or
   an edge node of the plurality of edge nodes that has more processing power available than other nearby edge nodes that are able to be connected to by the vehicle.

7. The method of claim 6, wherein the controlling entity is changed to another edge node of the plurality of edge nodes by passing state information of the vehicle to the another edge node, the another edge node is determined based on an expected direction of the vehicle and/or a threshold distance around the edge node.

8. A system for distributed vehicle processing for a vehicle, the system comprising:
   a memory storing instructions; and
   a processor executing the instructions to perform a process including:
      determining whether one of a first set of trigger conditions, one of a second set of trigger conditions, or one of a third set of trigger conditions are satisfied;
      in response to determining a first trigger condition of the first set of trigger conditions is satisfied, performing a first process corresponding to the first trigger condition on-board the vehicle;
      in response to determining a second trigger condition of the second set of trigger conditions is satisfied, prompting a second process corresponding to the second trigger condition by transmitting an edge request to an edge node and receiving an edge response from the edge node; and
      in response to determining a third trigger condition of the third set of trigger conditions is satisfied, prompting a third process corresponding to the third trigger condition by transmitting a cloud request to a cloud node and receiving a cloud response from the cloud node.

9. The system of claim 8, wherein the first set of trigger conditions include:
   receiving control instructions from the edge node;
   receiving data from a GNSS receiver system; and
   receiving data from a sensor payload.

10. The system of claim 8, wherein the second set of trigger conditions include:
    an end of a flight data buffer period or a payload buffer period for data types that are to be reported to the edge node;
    an impending transition trigger condition for a transition between the edge node and a second edge node;

a regular heartbeat trigger condition;
one or more of weather radar trigger conditions, digital adaptive phased array radar trigger conditions, or vision trigger conditions;
detection trigger conditions;
augmentation trigger condition;
stale data trigger conditions; and/or
a query trigger condition.

11. The system of claim 8, wherein the third set of trigger conditions include an end of a flight data buffer period or a payload buffer period for data types that are to be reported to the cloud node.

12. The system of claim 8, wherein the vehicle includes actuation systems, one or more sensors, and/or payload systems, the vehicle is configured to host time sensitive functionality including sensor/payload data management logic and control logic,
the edge node is one of a plurality of edge nodes, the edge node is configured to host vehicle management logic, traffic management logic, mission planning logic, and/or navigation logic for the vehicle, and
the cloud node is configured to host mission payload logic and/or analytics logic.

13. The system of claim 12, wherein the edge node is a controlling entity of the vehicle that issues control instructions to the vehicle, and the edge node is:
a nearest edge node of the plurality of edge nodes to the vehicle;
an edge node of the plurality of edge nodes that has a smallest round trip latency; and/or
an edge node of the plurality of edge nodes that has more processing power available than other nearby edge nodes that are able to be connected to by the vehicle.

14. The system of claim 13, wherein the controlling entity is changed to another edge node of the plurality of edge nodes by passing state information of the vehicle to the another edge node, the another edge node is determined based on an expected direction of the vehicle and/or a threshold distance around the edge node.

15. A non-transitory computer-readable medium storing instructions that, when executed by a processor, cause the processor to perform a method for distributed vehicle processing for a vehicle, the method comprising:
determining whether one of a first set of trigger conditions, one of a second set of trigger conditions, or one of a third set of trigger conditions are satisfied;
in response to determining a first trigger condition of the first set of trigger conditions is satisfied, performing a first process corresponding to the first trigger condition on-board the vehicle;
in response to determining a second trigger condition of the second set of trigger conditions is satisfied, prompting a second process corresponding to the second trigger condition by transmitting an edge request to an edge node and receiving an edge response from the edge node; and
in response to determining a third trigger condition of the third set of trigger conditions is satisfied, prompting a third process corresponding to the third trigger condition by transmitting a cloud request to a cloud node and receiving a cloud response from the cloud node.

16. The non-transitory computer-readable medium of claim 15, wherein the first set of trigger conditions include:
receiving control instructions from the edge node;
receiving data from a GNSS receiver system; and
receiving data from a sensor payload.

17. The non-transitory computer-readable medium of claim 15, wherein the second set of trigger conditions include:
an end of a flight data buffer period or a payload buffer period for data types that are to be reported to the edge node;
an impending transition trigger condition for a transition between the edge node and a second edge node;
a regular heartbeat trigger condition;
one or more of weather radar trigger conditions, digital adaptive phased array radar trigger conditions, or vision trigger conditions;
detection trigger conditions;
augmentation trigger condition;
stale data trigger conditions; and/or
a query trigger condition.

18. The non-transitory computer-readable medium of claim 15, wherein the third set of trigger conditions include an end of a flight data buffer period or a payload buffer period for data types that are to be reported to the cloud node.

19. The non-transitory computer-readable medium of claim 15, wherein the vehicle includes actuation systems, one or more sensors, and/or payload systems, the vehicle is configured to host time sensitive functionality including sensor/payload data management logic and control logic,
the edge node is one of a plurality of edge nodes, the edge node is configured to host vehicle management logic, traffic management logic, mission planning logic, and/or navigation logic for the vehicle, and
the cloud node is configured to host mission payload logic and/or analytics logic.

20. The non-transitory computer-readable medium of claim 19, wherein the edge node is a controlling entity of the vehicle that issues control instructions to the vehicle, and the edge node is:
a nearest edge node of the plurality of edge nodes to the vehicle;
an edge node of the plurality of edge nodes that has a smallest round trip latency; and/or
an edge node of the plurality of edge nodes that has more processing power available than other nearby edge nodes that are able to be connected to by the vehicle.

* * * * *